United States Patent
Goldberg et al.

(10) Patent No.: US 10,764,233 B1
(45) Date of Patent: Sep. 1, 2020

(54) CENTRALIZED COMMUNICATION PLATFORM WITH EMAIL WHICH ORGANIZES COMMUNICATION AS A PLURALITY OF INFORMATION STREAMS AND WHICH GENERATES A SECOND MESSAGE BASED ON AND A FIRST MESSAGE AND FORMATTING RULES ASSOCIATED WITH A COMMUNICATION SETTING

(71) Applicant: Amazon Technologies, Inc., Seattle, WA (US)

(72) Inventors: Matthew E. Goldberg, Amsterdam (NL); Polo-Francois Poli, Voorburg (NL); Lori Dirks, Amsterdam (NL); Thomas Pare, Bois Colombes (FR); Gregory Whalen, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/368,326

(22) Filed: Mar. 28, 2019

(51) Int. Cl.
*H04L 12/58* (2006.01)

(52) U.S. Cl.
CPC ............ *H04L 51/36* (2013.01); *H04L 51/066* (2013.01); *H04L 51/16* (2013.01)

(58) Field of Classification Search
CPC ........ H04L 51/36; H04L 51/066; H04L 51/16
See application file for complete search history.

(56) References Cited

U.S. PATENT DOCUMENTS

| | | | | |
|---|---|---|---|---|
| 6,301,609 B1 * | 10/2001 | Aravamudan | .......... | H04L 51/26 707/999.001 |
| 6,970,907 B1 * | 11/2005 | Ullmann | ............... | H04L 51/066 709/206 |
| 7,130,885 B2 * | 10/2006 | Chandra | ................ | G06Q 10/10 709/206 |
| 7,680,895 B2 * | 3/2010 | Perlow | .................... | H04L 51/36 709/207 |
| 7,729,481 B2 * | 6/2010 | Thompson | .............. | H04L 51/00 379/88.13 |
| 7,966,373 B1 * | 6/2011 | Smith | .................. | G06Q 10/107 709/201 |
| 7,991,764 B2 * | 8/2011 | Rathod | .................. | G06Q 10/00 707/713 |
| 8,161,419 B2 * | 4/2012 | Palahnuk | ............... | G06Q 30/00 715/764 |
| 8,484,216 B2 * | 7/2013 | Berry | ..................... | G06Q 10/10 707/737 |
| 8,583,654 B2 * | 11/2013 | Palay | ..................... | H04L 51/16 707/741 |
| 8,768,882 B2 * | 7/2014 | Frees | ................... | G06Q 10/109 707/608 |
| 8,788,535 B2 * | 7/2014 | Bonev | .................. | G06Q 10/109 707/793 |

(Continued)

*Primary Examiner* — Daniel C. Murray
(74) *Attorney, Agent, or Firm* — BakerHostetler

(57) ABSTRACT

Method and systems are disclosed for communication associated with a communication platform. Third-party services and services internal to a service provider network may be integrated with the communication platform. The communication platform may allow communication via information streams that are accessible via a user interface of the communication platform and one or more external services. An example external service may comprise an electronic mail service.

20 Claims, 10 Drawing Sheets

(56) References Cited

U.S. PATENT DOCUMENTS

| | | | | |
|---|---|---|---|---|
| 9,152,725 | B2* | 10/2015 | Wong | G06Q 50/01 |
| 9,252,973 | B1* | 2/2016 | Lin | H04L 51/066 |
| 9,298,355 | B1* | 3/2016 | Beausoleil | H04L 51/28 |
| 9,405,432 | B2* | 8/2016 | Vats | G06F 3/011 |
| 9,456,044 | B2* | 9/2016 | Herman | G06F 16/9535 |
| 9,514,424 | B2* | 12/2016 | Kleinbart | G06Q 10/10 |
| 9,569,596 | B2* | 2/2017 | Marcus | G06Q 10/06 |
| 9,614,807 | B2* | 4/2017 | Spivack | G06Q 10/10 |
| 9,661,142 | B2* | 5/2017 | Gunasekar | H04M 3/567 |
| 9,769,180 | B2* | 9/2017 | Bedi | G06Q 10/10 |
| 9,779,094 | B2* | 10/2017 | Kumar | G06F 16/954 |
| 9,794,760 | B2* | 10/2017 | Quatrano | H04L 67/02 |
| 9,813,365 | B2* | 11/2017 | Antebi | H04L 29/06312 |
| 9,846,527 | B2* | 12/2017 | Hull | H04W 4/21 |
| 9,984,126 | B2* | 5/2018 | Hoagland | H04L 51/16 |
| 10,031,949 | B2* | 7/2018 | Giunio-Zorkin | H04L 67/2842 |
| 10,044,662 | B1* | 8/2018 | Mesters | H04L 51/22 |
| 10,063,501 | B2* | 8/2018 | Lane | H04L 51/18 |
| 10,101,893 | B1* | 10/2018 | Van Doorn | H04L 51/08 |
| 10,212,117 | B2* | 2/2019 | Ramalingam | H04L 51/04 |
| 10,216,709 | B2* | 2/2019 | Lane | H04L 51/063 |
| 10,348,655 | B1* | 7/2019 | Suhail | G06Q 10/10 |
| 10,360,287 | B2* | 7/2019 | Lane | G06Q 10/103 |
| 10,558,734 | B2* | 2/2020 | Rochelle | H04L 51/08 |
| 2003/0131050 | A1* | 7/2003 | Vincent | H04L 51/02 709/203 |
| 2003/0212746 | A1* | 11/2003 | Fitzpatrick | H04L 12/1827 709/206 |
| 2004/0254998 | A1* | 12/2004 | Horvitz | H04L 67/16 709/206 |
| 2004/0268246 | A1* | 12/2004 | Leban | G06F 40/166 715/239 |
| 2005/0132012 | A1* | 6/2005 | Muller | H04L 51/066 709/206 |
| 2006/0031334 | A1* | 2/2006 | Kim | H04L 51/066 709/206 |
| 2006/0271630 | A1* | 11/2006 | Bensky | G06Q 10/107 709/206 |
| 2007/0043687 | A1* | 2/2007 | Bodart | G06Q 10/107 |
| 2007/0282956 | A1* | 12/2007 | Staats | H04L 51/22 709/206 |
| 2008/0162651 | A1* | 7/2008 | Madnani | G06Q 10/107 709/206 |
| 2008/0208984 | A1* | 8/2008 | Rosenberg | H04L 51/04 709/206 |
| 2008/0215694 | A1* | 9/2008 | Chen | H04L 51/36 709/206 |
| 2008/0306972 | A1* | 12/2008 | Wilkin | H04L 51/066 |
| 2009/0157819 | A1* | 6/2009 | Hampton | H04L 51/066 709/206 |
| 2009/0316692 | A1* | 12/2009 | Trapp | H04L 51/00 370/352 |
| 2009/0325609 | A1* | 12/2009 | Rosen | H04L 63/105 455/466 |
| 2010/0131666 | A1* | 5/2010 | Feinberg | H04L 67/26 709/230 |
| 2010/0169417 | A1* | 7/2010 | Rukman | H04W 4/12 709/203 |
| 2011/0126126 | A1* | 5/2011 | Blair | G06Q 10/107 715/752 |
| 2011/0231489 | A1* | 9/2011 | Rathod | G06F 16/285 709/204 |
| 2012/0008753 | A1* | 1/2012 | Burnett | H04M 3/53333 379/88.17 |
| 2012/0016858 | A1* | 1/2012 | Rathod | G06Q 30/02 707/706 |
| 2012/0210334 | A1* | 8/2012 | Sutedja | H04L 51/16 719/314 |
| 2013/0007150 | A1* | 1/2013 | Hertz | H04L 51/36 709/206 |
| 2014/0006525 | A1* | 1/2014 | Freund | H04L 51/16 709/206 |
| 2014/0096033 | A1* | 4/2014 | Blair | H04L 51/04 715/752 |
| 2014/0245178 | A1* | 8/2014 | Smith | H04L 51/16 715/753 |
| 2014/0280602 | A1* | 9/2014 | Quatrano | H04L 67/02 709/205 |
| 2014/0365583 | A1* | 12/2014 | Kau | H04L 51/04 709/206 |
| 2015/0066476 | A1* | 3/2015 | Midmore | G06F 40/20 704/9 |
| 2015/0163206 | A1* | 6/2015 | McCarthy | H04L 63/104 713/171 |
| 2015/0195219 | A1* | 7/2015 | T S | H04L 51/066 709/206 |
| 2015/0229592 | A1* | 8/2015 | Rathod | G06F 16/285 709/206 |
| 2016/0149848 | A1* | 5/2016 | Vembu | H04L 51/36 709/206 |
| 2016/0149853 | A1* | 5/2016 | Anderson | H04W 4/14 709/205 |
| 2016/0269336 | A1* | 9/2016 | Blinder | H04L 51/36 |
| 2016/0269337 | A1* | 9/2016 | Blinder | H04L 51/36 |
| 2016/0330147 | A1* | 11/2016 | Antebi | H04L 51/04 |
| 2016/0342571 | A1* | 11/2016 | Lane | H04W 4/18 |
| 2016/0344667 | A1* | 11/2016 | Lane | H04L 51/36 |
| 2016/0344678 | A1* | 11/2016 | MacDonald | H04L 51/18 |
| 2016/0344679 | A1* | 11/2016 | Lane | H04L 51/02 |
| 2017/0068550 | A1* | 3/2017 | Zeitlin | G06F 9/4843 |
| 2017/0093781 | A1* | 3/2017 | Sharma | H04L 51/36 |
| 2017/0201575 | A1* | 7/2017 | Song | H04L 51/02 |
| 2017/0289086 | A1* | 10/2017 | Grotto | H04L 51/16 |
| 2018/0048604 | A1* | 2/2018 | Mikhailov | H04L 51/16 |
| 2018/0097755 | A1* | 4/2018 | Mody | H04L 51/063 |
| 2018/0183618 | A1* | 6/2018 | Jayaram | H04L 51/32 |
| 2018/0183619 | A1* | 6/2018 | Jayaram | H04W 12/02 |
| 2019/0007362 | A1* | 1/2019 | Shmunis | H04L 51/046 |
| 2019/0051301 | A1* | 2/2019 | Locascio | G10L 15/26 |
| 2019/0058680 | A1* | 2/2019 | Rosania | H04L 51/16 |
| 2019/0065839 | A1* | 2/2019 | Kavikkal | G06K 9/00456 |
| 2019/0155871 | A1* | 5/2019 | Lane | H04L 51/36 |
| 2019/0173812 | A1* | 6/2019 | Higgins | H04L 51/04 |
| 2019/0200177 | A1* | 6/2019 | Greene | G06Q 10/06 |
| 2019/0205461 | A1* | 7/2019 | Rodgers | G06F 3/167 |
| 2019/0327198 | A1* | 10/2019 | Connor | H04L 51/32 |
| 2019/0332721 | A1* | 10/2019 | Pathiyattuthody | G06N 20/00 |
| 2019/0334845 | A1* | 10/2019 | Rieseberg | G06F 3/0482 |
| 2019/0347668 | A1* | 11/2019 | Williams | H04L 67/2833 |
| 2020/0026783 | A1* | 1/2020 | Watanabe | G06F 16/176 |
| 2020/0036667 | A1* | 1/2020 | Talton | H04L 51/16 |

\* cited by examiner

CENTRALIZED COMMUNICATION PLATFORM WITH EMAIL WHICH ORGANIZES COMMUNICATION AS A PLURALITY OF INFORMATION STREAMS AND WHICH GENERATES A SECOND MESSAGE BASED ON AND A FIRST MESSAGE AND FORMATTING RULES ASSOCIATED WITH A COMMUNICATION SETTING

BACKGROUND

Email is ubiquitous in today's workplace, yet people spend large amounts of time endlessly reacting to a flood of messages, even if the emails are not the most important things to focus on. Despite this time spent in their inbox, people still struggle to find the relevant information necessary to make high quality, timely decisions. And since email is hard to organize by teams or topics, email is less collaborative and people tend towards one-on-one conversations instead of openly communicating. While some companies have moved to alternative collaboration tools, these tools all fall short as they have not replaced email and instead have just created silos of communication and information. With content, messages, and tasks scattered across a myriad of disconnected tools, it is becoming harder for users to find and keep track of information.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
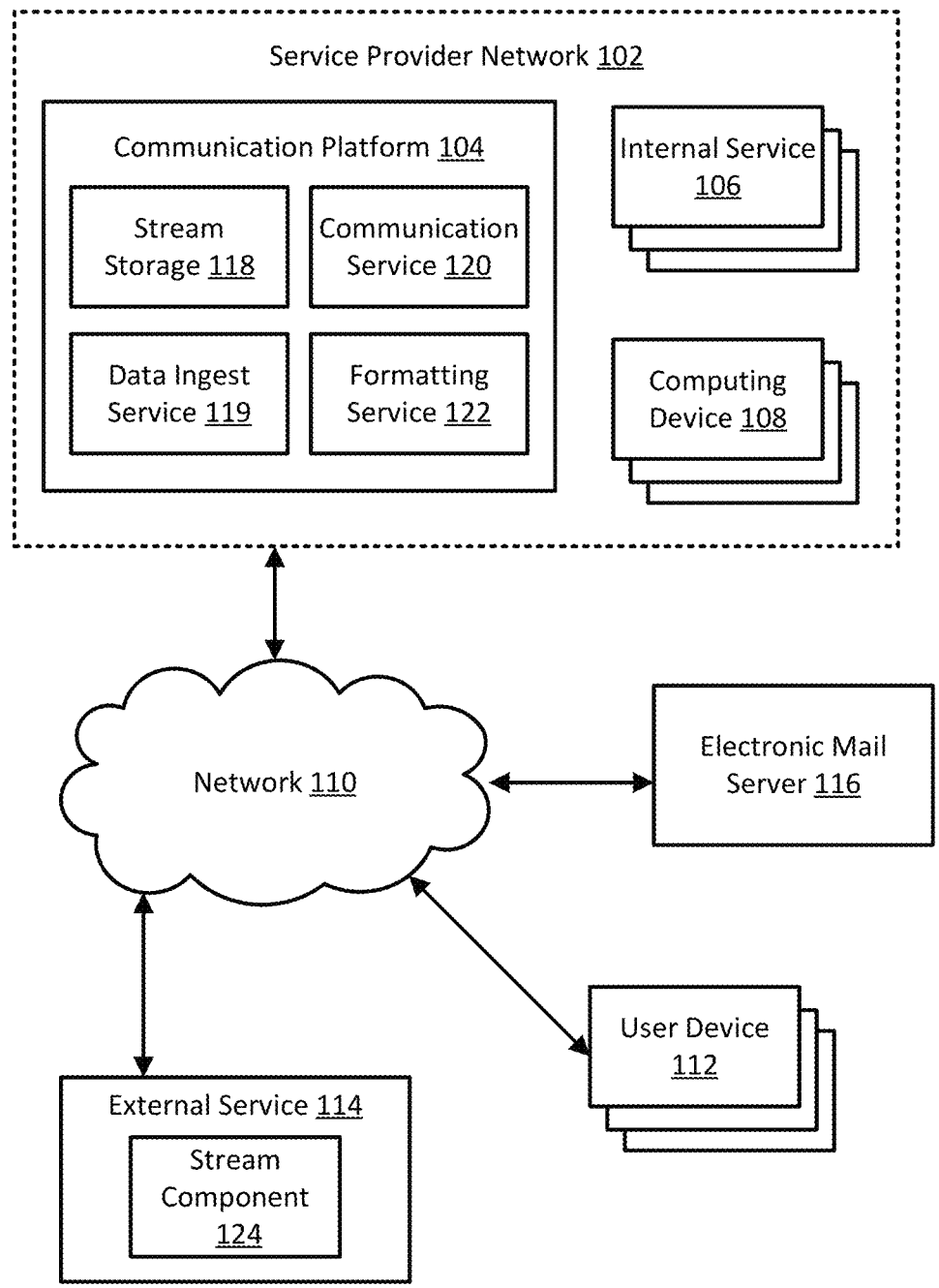
FIG. 1 is a diagram illustrating an example computing system for communication.

Methods and systems are disclosed for providing communication between a plurality of users. An example system may comprise a communication platform. The communication platform may host a plurality of information streams. The information streams may be used for improving workplace communication by allowing team members to discover, read, and/or contribute to all of their workplace conversations. The communication platform may also integrate with other applications to enable users to communicate from within the applications already used by the users. These other applications may send communication data, such as messages, to the communication platform instead of creating new silos of communication and information. The communication platform may be interoperable with electronic mail. The communication platform may allow users to choose whether to use a user interface of the communication platform or participate in discussions from a traditional email client.

While most other communication tools only exacerbate the problem of siloed information by spreading discussions across more places, the presently disclosed techniques involve storing conversations in a central communication platform, allowing for access to communication data in a single platform. Through integrations with other productivity applications, the communication platform enables users to have discussions in the context of the relevant application. Similarly, users may be able to post data for various applications into a single information stream. As an example, users may use the communication platform to securely embed a company's internal web content into information streams.

Users who have joined an information stream may be referred to as members. In an embodiment, messages in an information stream are not sent to every member of the information stream individually. Instead a message is sent to the stream and members view messages in that stream. That allows all members of the information stream to share the same view of the stream. In an embodiment, when a message is modified (e.g., deleted, updated, associated with data, has associated data updated, tagged, associated with a comment, moved to a different topic, etc.) from the information stream, it is modified for every member. If a member leaves an information stream, that user will thereafter not be able to view the messages that the user had access to prior to leaving. When posting a new message to an information stream, it creates a conversation. A conversation preferably has a subject and defines what the discussion is about. Any member can participate in the conversation and reply to messages. All the messages for a conversation are displayed together so that it is easy to distinguish the various conversations in the stream.

The communication platform may enable users stay up-to-date by storing all of the user's work-related information and related discussions in information streams. Information streams may be accessible by others in the same organization (e.g., allowing for open collaboration). Each information stream may be organized by topics (e.g., conversations). A new topic may be started with a message, a document, internal web content, and/or the like. The topic may continue as users respond to the initial post or other responses and assign tasks to each other. The communication platform may be associated with application programming interfaces (APIs). Through an API, the communication platform may integrate with other productivity tools enabling users to initiate and engage in discussions from whatever platform the users are already using.

The communication platform may also be configured to provide access to a virtual assistant to help manage responsibilities, such as tasks and scheduling. The virtual assistant may be controlled based on text commands. Users may enter text commands directly into a data item of an information stream. The virtual assistant (e.g., or service thereof) may determine that text from a user in the data item comprises a command for the virtual assistant. The virtual assistant may perform the task associated with the command (e.g. enabling workflow automation for everyday tasks).

Users may opt into the communication platform. A user may opt in by signing up for an account through a user interface (e.g., web interface or native mobile app). Users may use the user interface as a primary communication tool for accessing the communication platform. Users may create new information streams based on teams, projects, and other groups. Users may search for and join information streams created by other users (e.g., their coworkers). When a user logs in to the user interface, the user can navigate to the information streams the user finds most important. The user interface may also output an inbox of the user (e.g., presented alongside the information streams). Within an information stream, users can have discussions by responding to each other's messages, assigning and tracking action items, asking the virtual assistant to perform common tasks in the user's other applications, and/or the like. An issue, project, document, task, and/or other item may be created in an external application based on a data item posted to the information stream via the communication platform.

The disclosed communication platform is a technical improvement over conventional productivity tools. Conventional communication tools have many drawbacks in comparison to the disclosed communication platform. The disclosed communication platform and related techniques allow users to completely participate in information streams (e.g., or conversations therein) via email. Conventional platforms may have email notifications, but these platforms lack full interoperability with email, requiring everyone in the organization to adopt the communication tool to participate in the discussion. Since some users are more comfortable with email, either the user is forced to use a tool in which they are less productive or the user continues to use email, dispersing conversations across more tools that everyone now has to check. The presently disclosed communication platform reduces the siloing of discussions while enabling users to use the communication tool with which the user feels most productive.

The disclosed communication platform and related techniques may allow users to have threaded conversations. Many conventional communication tools offer a chat-style wall of text which is less effective for organizing information. As conversations interleave and scroll away, it is difficult to keep track of all the separate conversations and later come back to find information. By grouping the communication by conversations, the presently disclosed communication platform may organize relevant information together (e.g., so that it is easier to understand the latest status of each discussion). In the context of searching or browsing for past discussions, more relevant results are returned because the entire context of a conversation may easily be discovered.

The disclosed communication platform and related techniques may use a text-based interface to access a virtual assistant. Some conventional communication tools have basic chat bots functionality, but these chat bots are not customizable. Logic flows implemented by the virtual assistant may be pre-defined for a specific organization, team, group, or user. The virtual assistant may be able to use the context, such as the particular information stream where a command is typed to identify users and/or other information to fulfill a command. The interoperability of the disclosed communication platform may allow the virtual assistant to be integrated with external applications (e.g., to cause content to be generated in those applications). An example text based command may comprise an identifier of the virtual assistant, a command, and an identifier of another user. As a non-limiting example, a user may write to a specific information stream using the following: "@[virtual assistant name], schedule a meeting with @[other user] as required." A user may also use a speaker to communicate with the virtual assistant.

Conventional communication tools also do not have the functionality to integrate directly with external services. The communication platform allows for users to embed internal web content or other content from external services directly into an information stream. The communication platform also provides APIs that allow the communication features of the communication platform to be implemented in an external application. A single information stream of the communication platform can have data items generated from completely different applications hosted by different services providers.

FIG. 1 is a diagram illustrating an example computing system 100 for communication. The system 100 may comprise a service provider network 102. A service provider (e.g., or other entity) may manage the service provider network 102. The service provider network 102 may be at a centralized location or distributed across a plurality of geographic locations. The service provider network 102 may comprise a communication platform 104. The communication platform 104 may be configured to allow communication between a plurality of users. The service provider network 102 may comprise one or more internal services 106. The one or more internal services 106 may comprise services provided to users, such as one or more of the plurality of users. The one or more internal services 106 may be configured to implement one or more applications (e.g., web application, mobile application). The one or more applications may comprise productivity applications, such as word processing, electronic mail, presentation, project management, spreadsheets, note taking, messaging, conferencing (video conference, audio conference, screen sharing), visual editing (e.g., video editing, image editing), drafting (e.g., 3-D drafting, animating), computer programming, hosting (e.g., intranet, web hosting), and/or the like applications. The applications may comprise any other type of application, such as a social media, media storage, shopping, and/or the like.

The service provider network may comprise one or more computing devices 108 used to processes requests. The requests may be associated with the communication platform 104, the one or more internal services 106, and/or the like. The one or more computing devices 108 may comprise one or more storage devices. The one or more computing devices 108 may comprise a plurality of computing nodes, such as computing processors, computing cores, virtual machines, and/or the like. Example computing implementations are described further herein, such as in FIG. 6 and FIG. 7.

The system 100 may comprise a network 110. The network 110 may be configured to communicatively couple one or more of the service provider network 102, communication platform 104, the internal services 106, one or more user devices 112, an external service 114, an electronic mail server 116, and/or the like. The network 110 may comprise a plurality of network devices, such as routers, switches, access points, switches, hubs, repeaters, modems, gateways, and/or the like. The network 110 may comprise wireless links, wired links, a combination thereof, and/or the like.

The communication platform 104 may be configured to allow communication between a plurality of users. The communication platform 104 may store the communication in stream storage 118. The communication may be stored as a plurality of information streams. An information stream may comprise one or more data items. A data item may comprise text, image, video, audio, a combination thereof, and/or the like. A data item may comprise an application component. The application component may allow for editing of application data (e.g., a document, image, video) from a user interface of the communication platform 104. The application component may have application controls that allow access to functions of an application external to the communication platform 104. The application component may be associated with an application of the internal services 106, the external service 114, and/or the like.

An information stream may be organized based on one or more topics. A topic may be indicative of a conversation associated with a common interest, such as a meeting, project, question, deadline, task, and/or the like. A topic may be associated with one or more data items. An information stream may be represented as a plurality of topics, a plurality of data items, a combination thereof, and/or the like. An information stream may comprise associations (e.g., hierarchical associations, threaded association) between data items of the information stream. An association may indicate that a data item is associated with a particular topic. An association may indicate that a data item is in response to another data item. An association may indicate that a data item is part of a thread. A thread may comprise a data item and one or more additional data items that are associated based on an indication that the additional data items are in response to one or more prior data items.

The communication platform 104 may be configured to allow users to communicate based on electronic mail communication, the external service 114, the one or more internal services 106, a combination thereof, and/or the like. The communication platform 104 may comprise a data ingest service 119. The data ingest service 119 may be configured to receive data items from a variety of sources, such as the internal service 106, the external service 114, the electronic mail server 116, a user device 112, and/or the like. The data ingest service 119 may comprise an application programming interface (API) configured to receive calls to store data items. Different user interfaces for one or more of the internal service 106, the external service 114, the electronic mail server 116, or the user device 112 may be configured to send requests to the API to store data items created by users.

The data ingest service 119 may be configured to aggregate data items as information streams. The data ingest service 119 may associate received data items with corresponding information streams. An information stream may be associated one or more data collections, such as an activity feed, calendar, task list, asset collection (e.g., or asset list), pinned collection, and/or the like. The data ingest service 119 may cause the data collections associated with an information stream to be updated. If a data item comprises a calendar invite, a data collection comprising calendar events for the information stream may be updated. If a data item comprises an asset (e.g., from an internal service 106 or external service 114), a data collection that includes all the assets (e.g., or references to the assets) of an information stream may be updated. If a data item comprises a task item, a data collection comprising task items for the information stream may be updated.

The data ingest service 119 may be configured to determine a context for a data item received for an information stream. The data ingest service 119 may be configured to associate the data item with a topic of the information stream. The data item may comprise a topic identifier, a title of the topic (e.g., in a subject line of an email), and/or the like that may be used to determine a relationship of the topic and the data item. The data item may be determined as a response to another data item. The data ingest service 119 may be configured to associate the data item with the prior data item. The data item may comprise at least a portion of the prior data item, an identifier of the prior data item, and/or the like that may be used to determine a relationship between the data item and the prior data item. The data ingest service 119 may be configured to associate the data item with one or more users. The data item may comprise a reference to a user. The data ingest service 119 may recognize the reference to the user and cause the user to be associated with the data item. The user may receive a notification of the data item (e.g., via email, an activity feed).

The communication platform 104 may comprise a communication service 120. The communication service 120 may be triggered (e.g., based on receiving a data item) to cause communication of a data item to different user interfaces, protocols, and/or the like. The communication service 120 may be caused by the data ingest service 119 to communicate a data item to user interfaces associated with the communication platform, the electronic mail communication, the external service 114, and/or the one or more internal services 106. The communication service 120 may determine communication information for one or more users associated with an information stream. A user may be associated with an information stream, a topic, a thread, and/or the like. If a data item is posted to an information stream, topic, thread, and/or the like, the communication service 120 may determine communication information for communicating the data item. The communication information may comprise a communication setting, an address (e.g., network address, electronic mail address), an application (e.g., of the internal services 106, of the external service 114), user information associated with the application. The communication setting may indicate a preferred application, format, address, and/or protocol to receive communication. A communication setting may indicate that a user has requested to only communicate with the communication platform via one or more of electronic mail, the external service 114, or an internal service 106. The user may or may not have an account with the communication platform 104. The user may only be associated with an information stream, topic, and/or thread by entry of user information (e.g., contact information, preferred application to receive communication, email address) by another user that has an account with the information platform 104.

The communication platform 104 may comprise a formatting service 122 configured to format an information stream, topic, thread, and/or data item for communication to a user via electronic mail, the external service 114, and/or the internal service 106. The formatting service 122 may convert data items to a specific protocol, such as electronic mail protocol, or a protocol (e.g., JSON) for communicating with an application programming interface (e.g., of the external service or internal service). If the communication information indicates that a user requests email communication, then the formatting service 122 may format a data item based on one or more rules for formatting data items as electronic mail messages. If the communication information indicates that a user has requested communication via the external service 114, then the formatting service 122 may format a data item based on one or more rules for formatting data items for the external service 114. If the communication information indicates that a user has requested communication via the internal service 106, then the formatting service 122 may format a data item based on one or more rules for formatting data items for the internal service 106.

The formatting service 122 may be configured to format a data item for communication to a user based on a context of the data item. The context may be an association of the data item with another data item. The formatting service 122 may format the data item as part of a topic and/or thread. The data item may be formatted as part of a topic and/or thread by representing prior (e.g., and subsequent messages, if any) as threaded, in reply to one another, as a hierarchy, and/or the like. A prior data item of the same topic may be shown as quoted text (e.g., in the same way a reply email shows the original email as quoted text) in the same electronic mail message as current data item being sent to a user. The electronic messages may show a plurality of data items, each data item may be represented as part of a hierarchy based on level of indentation or other formatting.

The communication platform 104 may be configured to receive data items from one or more of the electronic mail server 116, a user device 112, the external service 114, the internal service 106, and/or the like. The received data items may be stored in the stream storage 118. The received data items may be represented to the plurality of users via one or more user interfaces (e.g., web interface, mobile application interface) managed by the service provider. The received data items may also be sent out to any users associated with electronic mail, the external service 114, the internal service 106, and/or the like. The formatting service 122 may convert any data items from the received format to a format associated with the stream storage 118 and/or to a format associated with the one or more user interfaces managed by the service provider. The formatting service 122 may convert any data items from the received format to a format associated with an internal service, the external service 114, and/or electronic mail.

The internal service, the external service 114, and/or the electronic mail server 116 may communicate (e.g., data items) with the communication platform via one or more application programming interfaces. The one or more application programming interfaces may comprise (e.g., or define) one or more methods, functions, data parameters, data fields, formatting requirements, uniform resource identifiers, and/or the like for communicating data items to and from the communication platform.

The external service 114 may comprise a stream component 124 configured to communicate with the communication platform 104. The stream component 124 may be configured to communicate via the one or more application programming interfaces. Users of the external service may be able to use the stream component to add a communication (e.g., commenting) layer to an application (e.g., web application, mobile application) that does not already have this functionality. The stream component 114 may be able to associate content of the external service 114 with communication, such as conversations, information streams, topics, and/or data items of the communication platform 114. The stream component 114 may be configured to cause the communication platform 104 to store the communication in the stream storage 118. The stream component 114 may be configured to cause the communication platform 104 to generate new information streams, topics, and/or threads based on communication received by the stream component 124. The stream component 114 may be configured to obtain (e.g., by request or by push communication) communication from the communication platform 114 and cause output of the communication via a user interface of the external service 114. The stream component 114 may receive one or more commands from the communication platform. The one or more commands may cause the stream component to generate content using the external service.

The electronic mail server 116 may be configured to route electronic mail messages. The electronic mail server 116 may receive electronic mail messages from the one or more user devices 112, the communication platform 104, and/or the like. The electronic mail server 116 may send electronic mail messages to corresponding destination mail addresses. In some implementations, the communication platform 104 may be associated with a different electronic mail server than an electronic mail server associated with the one or more user devices 112. The electronic mail server 116 may determine another electronic mail server associated with the destination mail address and send a received electronic mail message to the determined electronic mail server to a user device 112 associated with the mail address. The internal services 106 may comprise an electronic mail server associated with the communication platform 104. The electronic mail server of the internal services 106 may send and/or receive electronic mail messages addressed to and/or sent from the communication platform 104.

The electronic mail server 116 may be configured to send electronic mail messages from the communication platform 104 to the one or more user devices 112. The electronic mail messages may be generated based on data items stored by the communication platform 104. The electronic mail server 116 may send electronic mail messages to the communication platform 104 from the one or more user devices 112. The electronic mail messages from the one or more user devices 112 may be in response to the electronic mail messages generated based on data items. The electronic mail messages from the one or more user devices 112 may not be associated with a particular information stream, topic, or thread. The communication platform 104 may receive the electronic mail messages from the one or more user devices 112 and generate a new information stream, topic, and/or thread (e.g., if an instruction appears in the electronic message and/or if the message is not associated with a particular information stream, topic, and/or thread).

The one or more user devices 112 may comprise a computing device, such as mobile device, smart devices (e.g., smart watch, smart glasses, smart phone), a computing station, a laptop, a tablet device, and/or the like. The one or more user devices 112 may be configured to output one or more user interfaces, such as a user interface associated with communication platform 104, an electronic mail user interface, a user interface associated with the external service 114, a user interface associated with an internal service 106, and/or the like.

The following is a more detailed explanation of the communication platform and related techniques as disclosed herein.

The communication platform 104 may be configured to allow integration with the one or more internal services 106. In an embodiment, an internal service 106 may comprise a virtual assistant. The virtual assistant may have predefined logic (e.g., user defined logic) that is customized to an organization, group, and/or user. The communication platform 104 may allow the virtual assistant to determine that text in an information stream comprises a command for the virtual assistant. A specific string may be associated with invoking the virtual assistant such as "@[virtual assistant name]" where the brackets indicate any appropriate virtual assistant name.

The communication platform 104 may be configured to access the virtual assistant to perform actions based on data items posted in an information stream. The virtual assistant may be accessed via several concurrent asynchronous discussions stored via information streams. The virtual assistant may be used to assign tasks to a member of the information stream. The virtual assistant may be accessed outside of the context of the communication platform 104. A user may ask (e.g., via a smart speaker, microphone, email, or mobile phone) the virtual assistant to provide information about updates to an information stream. The virtual assistant may query the communication platform 104 to determine one or more data items of the information stream. The virtual assistant may summarize the data items, read the data items, indicate who posted the data items, indicate how many data items have been posted since a certain time, and/or the like. A user may ask (e.g., via a smart speaker, microphone, email, or mobile phone) the virtual assistant to post a data item on the information stream.

The virtual assistant may schedule meetings based on text or other information posted on an information stream. The virtual assistant may automatically set up (e.g., or reserve) a conference session (e.g., audio, video, screen sharing) based on text or other information posted on an information stream. The virtual assistant may post a notification about a meeting and/or conference information to the information stream (e.g., if the meeting is set up outside of the communication platform 104, e.g., by asking the virtual assistant via a microphone, text message, email, etc.). The virtual assistant may cause a new topic to be generated to store information about the meeting. The communication platform 104 may comprise a helper service, API, and/or other component that communicates data to and from the virtual assistant. In some scenarios, the virtual assistant may be similarly implemented as external service 114.

In an embodiment, an internal service 106 may comprise a website service (e.g., internal website service, intranet service, web hosting service). An organization may subscribe to the website service. The website service may allow web content to be posted and/or updated for access by users associated with the organization. The web content may comprise policy information, project information, resource information, and/or the like. The communication platform 104 may be configured to allow users of the website service to post content from the website service as one or more data items in an information stream. The communication platform 104 may be configured to allow users of the website service to post links that users may use to access (e.g., securely access) the website service from the communication platform. If credentials are approved, the user may directly view the website in the information stream and/or be redirected to a user interface associated with the website service. The communication platform 104 may comprise a helper service, API, and/or other component that sends and/or receives data from the website service. In some scenarios, the website service may be similarly implemented as an external service 114.

In an embodiment, an internal service 106 may comprise a monitoring service. The monitoring service may be configured to collect metrics about one or more services and/or resources, such as cloud computing services, cloud storage, networking resources, virtual machine services, and/or the like. The monitoring service may generate notifications if certain conditions are met associated with the metrics. The communication platform 104 may be configured to output notifications, metrics, and/or other monitoring information received from the monitoring service in an information stream, topic, thread, and/or the like. The communication platform 104 may be configured to communicate commands associated with the services and/or resources to the monitoring service or another service, such as a command line interface. Users may post a message in an information stream, topic, thread, and/or the like that may be determined to be a command associated with the services and/or resources. The communication platform 104 may cause the monitoring service and/or command line interface to perform the command. The communication platform 104 may comprise a helper service, API, and/or other component that communicates data (e.g., commands, metrics) to and from the monitoring services and/or command line interface. In some scenarios, the monitoring service and/or command line interface may be similarly implemented as an external service 114.

In an embodiment, an internal service 106 may comprise a document editing service. The document editing service may allow users to draft and edit documents. Users may collaborate on the drafting and/or editing of documents. The communication platform 104 may be configured to store an information stream associated with documents and/or a document folder. Users may post on an information stream data items, such as comments on the documents, edits to the documents, or the documents themselves. The document editing service may allow viewing of the data items from within an application interface of the document editing service. Users that have permissions to access the information stream may also be given permission to access the documents and/or document folders associated with the information stream. The communication platform 104 may comprise a helper service, API, and/or other component that communicates data to and from the document editing service. In some scenarios, the document editing service may be similarly implemented as an external service 114.

In an embodiment, an internal service 106 may comprise one or more messaging services (e.g., email service, chat service, message board). The communication platform 104 may be configured to store an information stream associated each of the one or more messaging services. Messages from one of the one or more messaging services may be accessed in a user interface for a different one of the one or more messaging services. As a non-limiting example, two users may be able to send personal chat messages between each other that are associated with a posting and/or thread on a message board. A topic (e.g., private topic for the two users) may be stored (e.g., or generated) in the information stream associated with the message board (e.g., or thread of a message board). Similarly, the communication platform 104 may be configured to store (e.g., or generate) topics based on private chats associated with an email message or email chain. The communication platform 104 may comprise a helper service, API, and/or other component that communicates data to and from the one or more messaging services. In some scenarios, the one or more messaging services may be similarly implemented as an external service 114.

The communication platform 104 may be configured to communicate with any service using the one or more APIs. The one or more APIs may be configured to read from and write data to information streams. The one or more APIs may be configured to receive notifications. This functionality enables applications (e.g., new applications, external applications associated with external service 114, applications associated with internal services 106) to be built that use the information streams for communication associated with the application. Data items (e.g., messages, posts, content) may be generated directly in the application by users of the application. The data items may be stored by the communication platform 104 as part of an information stream. The information stream may be accessed and edited within the application. In an embodiment, the application may be configured to allow users to select content or portions of content generated by the application to insert the content as a data item or as part of a data item for an information stream. A user may select a portion of the content (e.g., a paragraph of a document, a portion of an image, a snippet of computer code) and provide a comment associated with the selected content. Both the selected content and the comment may be sent to the communication platform 104 for storage as a data item of an information stream.

The following description provides further example details on implementing information streams. An information stream may comprise a shared space where users can start conversations, discuss topics, and share information. Within an information stream, messages (e.g., data items) may be grouped by topic (e.g., or conversations) to allow several topics to be discussed in parallel while preserving a logical structure to the information stream. The data items of the information stream may comprise messages and responses. The data items may comprise a document, internally accessible web content embedded using a service, a calendar invitation, simply text, a combination thereof, and/or the like. An information stream may be organized in a variety of ways by users. An information stream may be organized based on a team, a project, a working group. The information streams, topics, and/or data items may be private or public. Users may become members of or otherwise subscribe to a particular information stream.

Users may be associated with different types of roles for an information stream. Standard members (e.g., default or most common role) may have the ability to send data items to an information stream, view the data items, and delete the user's own data items. Moderators may have the permission of standard users, but also may have the ability to delete messages from any member of the community. Admins may approve subscription requests to the information stream. Admins may be responsible for the settings of the stream. Admins may promote standard members to Moderator or Admin.

An information stream may be discoverable (e.g., by default) by any user in an organization. An information stream may be open to self-subscription and contribution. The settings of an information stream may be changed so that information stream cannot be found, requires an admin to add new members, and/or can only be posted to by a certain set of users.

Topics and/or data items may be persisted within the stream. New members may have access to the topics and data items posted to the information stream before the new member joined. A user who accesses an information stream only by email may later access the information stream by an application interface (e.g., web interface or mobile app) to access all the data items of the information stream (e.g., whether previously sent to the user or not). If a user opts into email communication, the user may receive data items subsequent to the time of opting in. Prior data items (e.g., data items posted before the time of opting in) may or may not be sent to the user after opting in to email communication. An email may comprise relevant data items, such as the most accessed messages in a topic (e.g., conversion), an attachment, a portion (e.g., extract) of content stored in a service, a calendar item associated with the data item and/or topic, a task list item associated with a data item and/or topic, a digest of activity, and items from an activity feed associated with the data item and/or topic, other information that satisfies a relevance criteria and/or the like. For example, if a user comments on only a portion of a document stored in a cloud email service, the portion of the document can be added to the email and/or the document may be attached to the email. An email may comprise a digest of the relevant data items (e.g., with links to view the items). Users may access an information stream via both email communication and a user interface of the communication platform.

In an embodiment, one or more of the data items of an information stream may be protected using a key, such as an encryption key, certificate, or password. The key may be associated with (e.g., owned by, assigned to) an organization, a group of users, and/or a single user. The data items including messages, attachments, and metadata may be protected using the key associated with the organization. If access to this key is revoked, all of the data items (e.g., whether in one information stream or multiple) may be unreadable.

Information streams can be created directly from a user interface of the communication platform 104. A name and/or a description may be used to generate a new information stream. The creator of an information stream may automatically become an administrator of that information stream. Members can be added to the information stream and begin posting data items. An information stream, topic, and/or thread may be associated with an email address. The communication platform 104 may generate a new email address and/or a prior email address (e.g., one associated with a mailing list) may be used. The email address may be used to send and receive data items for the information stream. In an embodiment, the communication platform 104 may use information (e.g., email messages, user information) from a mailing list to generate a new information stream. Members of the mailing list may be automatically added as members of the information stream. Users of the mailing list may opt in to using the information stream via the user interface of the communication platform 104 and/or may continue to access the information stream as an electronic mailing list.

In an embodiment, users of the communication platform 104 may search for existing information streams from a user interface (e.g., even if the user does not have an account in the communication platform 104) based on name and/or description. Open, read-only, and restricted streams may be returned in the search results for users without an account. Once an information stream is found, it is possible to join (e.g., if the information stream is open or read-only) or request access (e.g., if the information stream is restricted) from the user interface. Private streams may not be discoverable and can only be joined if an admin adds a user to the information stream.

To use the communication platform 104, users of an internal service 106 or external service 114 (e.g., such as a web mail service) users may need to opt in (e.g., create an account) to the communication platform 104. After the user opts in to the communication platform 104, a user interface of the internal service 106 or external service 114 may be augmented with features associated with the communication platform 104. The features may allow the user to create information streams, add members to information streams, join existing information streams, and/or the like from the internal service 106 or external service 114. The user may also view and/or post data items to an information stream from the internal service 106 or external service 114.

A user may search the communication platform 104 and related services. A user may input keywords into the search bar of a user interface of the communication platform. The communication platform 104 may search through content from all of the internal services 106 and external services 114 that have integrated search capabilities. The search results may comprise topics (e.g., conversations) that match the query from open and read-only streams, as well as any you subscribed to by the user. A search result may comprise a snippet of the matching text which, when clicked on, will send the user directly to the relevant message. It is possible to further refine queries to specific information streams if needed.

In an embodiment, the communication platform 104 may allow users to set notifications for activity in information streams (e.g., on a stream-per-stream basis). Notifications may be delivered via at least two different channels: as an electronic mail message in an inbox or as a push notification on a user interface of the communication platform 104. A user may adjust the user's settings so that the user receives notifications for all messages, for certain topics, and/or a periodic digest based on the information stream's activity. Notification settings for an information stream may be set by each member through a central notification panel.

The communication platform 104 may allow users to control what information streams, topics, and/or data items are presented to the user. In an embodiment, the user may follow (e.g., subscribe) and/or mute different users, topics, information streams, and/or the like. Following and muting ensure that the user will and will not, respectively, receive updates for a topic regardless of the notification setting. In an embodiment, the user may pin different information streams, topics, or data items. Pinning controls which information streams, topics, and/or data items appear at the top of the information stream even if other information streams, topics, and/or data items have more recent activity.

In an embodiment, the communication platform 104 may allow users to mention specific users in data items. An example syntax may comprise using "A[user name]" (e.g., @Polo) to indicate that a specific user's attention is requested. In that case, the mentioned member of the stream may receive a notification about that mention regardless of the notification settings this member has for the stream or topic. From the notification, the user may be directed to the information stream, topic, and/or data item. Tasks can also be assigned to user by mentioning the user in a command to the virtual assistant (e.g., via text command such as "@[assistant] assign a task to @[user]").

If a user does not have an account with the communication platform and/or chooses only to access information streams via electronic mail, engaging in conversation via an information stream may appear as an interaction with a distribution list. The user may receive data items (e.g., messages) posted to information streams of which the user is a member as normal emails. The email received by the user may include all of the data items associated with a particular topic (e.g., or conversation) and/or thread. The electronic mail message received by the user appear may indicate a user who posted the data item. As a non-limiting an example, the email may appear to have been sent from "[First Name] [Last Name] via [Communication Platform Name]<stream-mail-list+conversationID@organization.awsapps.com>". Replying to the electronic mail message may post a new message to that information stream and/or topic. The reply message may appear as a new data item of a topic. The reply message may appear as a new data item in response to a prior data item (e.g., creating a new thread or topic). A new message can be sent to the address (e.g., not in reply to another data item), and the new message may be added as a new data item, may be added as a new data item starting a new topic and/or thread, and/or the like. If a user does not have membership in an information stream, the user may receive a reply message indicating that the message is not deliverable.

The communication platform 104 may represent some content differently via electronic mail than represented in the user interface of the communication platform 104. If the content is viewable (e.g., only viewable) from an application external to electronic mail client, the electronic mail message may comprise a link to access the content. If supported by the electronic mail client, the communication platform 104 may embed the content via a script or executable component in the electronic mail message. The electronic mail client may output the content to the user by executing the script or component.

In an embodiment, users that access the communication platform 104 via email may create new topics of an information stream by sending an electronic mail message to the email address (e.g., or email list) associated with an information stream. The user may control notification settings associated with electronic mail message. The user may elect to not receive any electronic mail messages from any information streams. The user may elect to receive electronic mail messages for all data items of an information stream. The user may elect to receive electronic mail messages for data items that specifically mention the user. The user may be able to change the settings via email or via the user interface of the communication platform. Another user (e.g., moderator, admin) may change the notification settings associated with the user (e.g., if the user does not have an account set up).

The communication platform may be implemented to address a variety of different communication problems. The following are several non-limiting examples of usage of the communication platform 104. The communication platform 104 may be configured to share information between different locations or teams of a company. Employees at one location of a company may use an information stream to share information with each other. Employees at another location of the company may search for and find the stream using the communication platform 104. The employees at the second location may find information (e.g., a recipe, a sales technique, a discount) and use the information to boost sales at the first location.

In an embodiment, the communication platform 104 may be configured by members of a team to stay in contact during travel. A manager of a team may be able to continue to monitor collaboration of the team over an information stream using email while traveling. A quick email response by the manager allows the team to continue to be aligned with the direction of the manager while traveling.

The communication platform 104 may be configured to implement commenting functionality for a third-party application. Using an API of the communication platform 104, the ability to comment may be integrated directly into the third-party application (e.g., an app for quickly building web and mobile application allows users to comment on content)

In an embodiment, the communication platform 104 may be configured for communication in a hiring system. The hiring system may comprise a single user interface that allows posting of feedback to an information stream (e.g., stored by the communication platform 104), having a centralized discussion via the information stream, and/or asking a virtual assistant to create an action item for a recruiter to follow up with a prospective hire.

The communication platform 104 may be configured to improve efficiency. In an embodiment, the communication platform 104 may monitor communication of an organization to determine work flows, opportunities for efficiency, and other useful information. Analysis of data may allow for the determination of usage patterns. Intelligent suggestions may be automatically provided to users to automate repetitive tasks to help the users be more productive.

In an embodiment, the communication platform 104 may be configured to manage meetings for an organization. A large organization may have a weekly meeting to discuss operations. The communication platform 104 may be used to create an information stream for review and setup a recurring meeting. The information stream may be used as a shared space that all participants may use to have open and/or moderated conversations. A meeting may be scheduled each week (e.g., using a scheduling service), added to the calendar of each recipient, appear as a new conversation in the stream, and/or be live broadcasted within information stream (e.g., so that thousands of the information stream's members can watch). As the meeting progresses, important decisions and action items may be captured by the virtual assistant. The virtual assistant may link back to the data items (e.g., topic or conversation) in the information stream so that users (e.g., including those who did not attend live) can see the outcome and continue an offline discussion. As new members of the organization are added to the information stream, these members will be able to go back and review data items from prior meetings (e.g., the video, outcomes, tasks, and discussions).

The communication platform 104 may be configured to manage different tasks in parallel. In an embodiment, a user may use the communication platform 104 to manage tasks in parallel, such as planning a trip, approving expense reports, and doing a code review. To help manage these tasks, a user can use built-in or custom message-based logic associated with a virtual assistant. The user may type, "@[assistant], when is the best time to visit [user]?" to begin planning your trip. While the user waits for a response, the user may start other conversations with the virtual assistant for the other tasks. The user may be notified when the virtual assistant has an answer of when a good time to visit is. The user can view the topic (e.g., or conversation, or data item) again and ask the virtual assistant to start looking for flights.

Figure 2A:
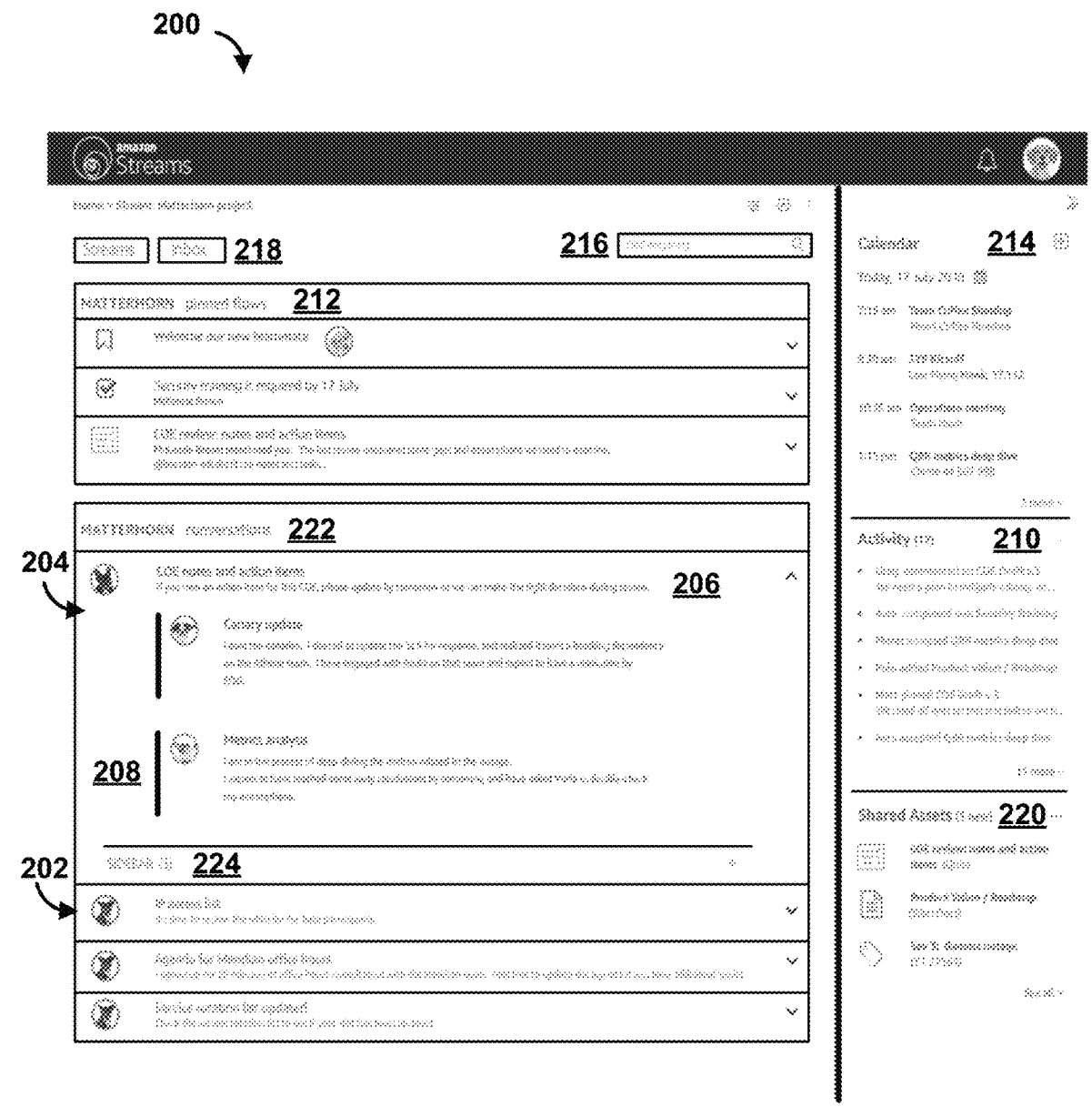
FIG. 2A is a diagram illustrating an example user interface of a communication platform.

FIG. 2A is a diagram illustrating an example user interface 200 of a communication platform. The user interface 200 shows an example view of an information stream. The information stream may comprise a plurality of data items 202. The plurality of data items 202 may comprise text (e.g., messages, comments, questions) and/or other elements (e.g., embedded code, video, images, documents, etc.). The plurality of data items 202 may be generated by users of the communication platform and/or generated based on data from a service separate from the communication platform. The plurality of data items 202 may be shown in order, such as chronological order. In an embodiment, the information stream may comprise a topic 204. The topic 204 may comprise an originating data item 206 and one or more subsequent data items 208. In an embodiment, if data items are in response to prior data items and/or associated with the same topic, a threading format may be used to organize data items. As shown in FIG. 2A, the threading may comprise indenting messages below the originating data item 206. It should be understood that other threading formats may be used.

The user interface 200 may also comprise other interface elements, such as an activity feed 210, overview section 212, calendar section 214, search bar 216, and/or other information associated with the communication platform. The user interface 200 may comprise an inbox 218. The inbox 218 may comprise notifications associated with an information stream, associated with the communication platform, and/or messages from other users. The inbox 218 may be presented with the information streams associated with a user. A user may become associated with an information stream by subscribing to the information stream and/or being added to an information stream by another user or service.

If an information stream is being viewed in the user interface 200, a user may post a new data item and/or topic. The data item may comprise web content, a reference to a document, and/or any other supported types of content. Other users associated with the information stream will see a new topic and may contribute to the topic by replying with a message, web content, document reference, by liking the originating post, by asking a virtual assistant via a text interface to interact with other tools, and/or the like. As the conversation progresses, the user or the other members of the information stream may assign action items to and/or schedule meetings with other members of the information stream from directly within the topic (e.g., or grouping of data items, or within a data item associated with the topic). A summary of all the meetings, tasks, documents and other items relevant to the information stream may be output on a side user interface 200 (e.g., in the calendar section 214, activity feed 210) so that users can keep track of these items. The user interface 200 may also allow users to view all meetings and/or tasks for all the user's information streams in one place.

The user interface 200 may comprise a shared assets section 220. The shared assets section 200 may comprise files, documents, media, and/or the like. A title of each asset may be listed. The application (e.g., internal service, external service) associated with the asset may also be listed. If an asset is posted as a data item of an information stream (e.g., or as a link or attachment to a data item), the user interface 200 may add a reference to the asset to a collection (e.g., list) of assets shown in the shared assets section 220. Users may access assets associated with the information stream by accessing the shared assets section 220 instead of having to browse through old messages to find a particular asset.

The shared assets section 220 may show the most recent documents. The shared assets section 220 may comprise an interface element that users can click to see all documents associated with an information stream. An interaction with an interface element may collapse the other sections to the right of the rail to allow more space to show the assets. The expanded shared assets section 220 may allow users a variety of ways to sort, filter, and search the assets (e.g., by file type, by associated people, by date created/modified, by topic, etc.)

The example assets listed in the shared asset section 220 show that a variety of types of assets may be collected in an information stream. In this example, the most recently updated items include a document for a collaboration platform (e.g., that stores checklists, chat messages, project plans, and other information, such as a Quip document), a document for a cloud document platform (e.g., a WorkDocs document), and a ticket of a trouble ticketing platform (e.g., TT ticket).

The activity feed 210 shows a variety of types of activities listed. An example activity may comprise an indication that a user commented on a document. The activity may list the user commenting and/or the document to which the comment applies. An example activity may comprise a user completing a task. The activity may list the user (e.g., associated with the information stream) completing the task and/or the task that was completed. An example activity may comprise a user (e.g., associated with the information stream) accepting a meeting invitation. An example activity may comprise pinning documents to a pinned area. An example activity may comprise a user adding an asset to the information stream.

The overview area 212 may comprise one or more pinned flows. A pinned flow may comprise a topic (e.g., conversation) that a user would like to have displayed in the overview area 212. The pinned flow may be shown in the overview area 212 regardless of whether there is recent activity in the pinned flow. The pinned flows 212 may comprise a single data item, such as bookmark, data indicating a task is completed, a task itself, or a comment associated with a document. The pinned flows 212 may show the most recent (e.g., or any unread) data item for a topic (e.g., or conversation).

The user can access the pinned flow without having to browse through the list of topics (e.g., conversation) 222. The list of topics 222 may prioritize showing more recent topics and/or data items over prior topics and/or data items. As an example, the topic 204 may be shown on the top of the list of topics 222 if the topic 204 has been updated more recent than the topics listed further below in the list of topics 222. The subsequent data item 208 may be shown as part of the topic 204. For example, the subsequent data item 208 may be the most recent data item added to the information stream.

The user interface 200 may be configured to associate (e.g., or link) related topics (e.g., conversations), data items, and/or the like. The topics and/or data items may be associated based on a user input indicative of the association. The topics and/or data items may be automatically associated based on similarity. The topics and/or data items may be associated based on similarity of users, timing, linked assets, similarity of text in messages, and/or the like. The user interface 200 may display the associated topics and/or data items via a sidebar 224. The sidebar 224 may be expanded to show the associated topics (e.g., conversations), data items, and/or the like. The sidebar 224 may comprise private data items, such as data items limited to a subset of the users of the information stream. Users may send private chat messages to teach other regarding a data item. These private messages may be accessed via the sidebar 224.

The communication platform (e.g., or user interface 200) may allow users to associate other users with a data item. For example, a symbol, such as "A" may be associated with a user (e.g., @Polo). The communication platform may detect the symbol and send a notification of the user about a data item comprising the reference to the user (e.g., even if that user did not have any notification activated for that information stream). Notifications with mention may be shown in the user interface 200, such as in the activity feed 210.

The communication platform (e.g., or user interface 200) may allow users to assign tasks (e.g., TODOs) to users of the information stream. A symbol, such as "[ ]", may be associated with a user using "[ ]," e.g., [ ]Polo. The communication platform may detect the symbol and cause a task to be generated and/or assigned to the user whose name is next to the symbol. The tasks for users associated with an information stream may be shown in the user interface 200, such as in the activity feed 210, the pinned flows 212, the calendar 214, and/or as a separate task list. The tasks may be displayed in chronological order (e.g., by the date the task was created). If a user selects a particular topic (e.g., or conversation), the tasks (e.g., or only the tasks) for that topic may be shown via the user interface (e.g., or may be otherwise prioritized, emphasized). The user interface 200 may be configured to allow a user to select a task. If a user selects a task, the user interface 200 may select, display, and/or otherwise emphasize the topic that this task was created from. The remaining tasks may be filtered by conversation.

Figure 2B:
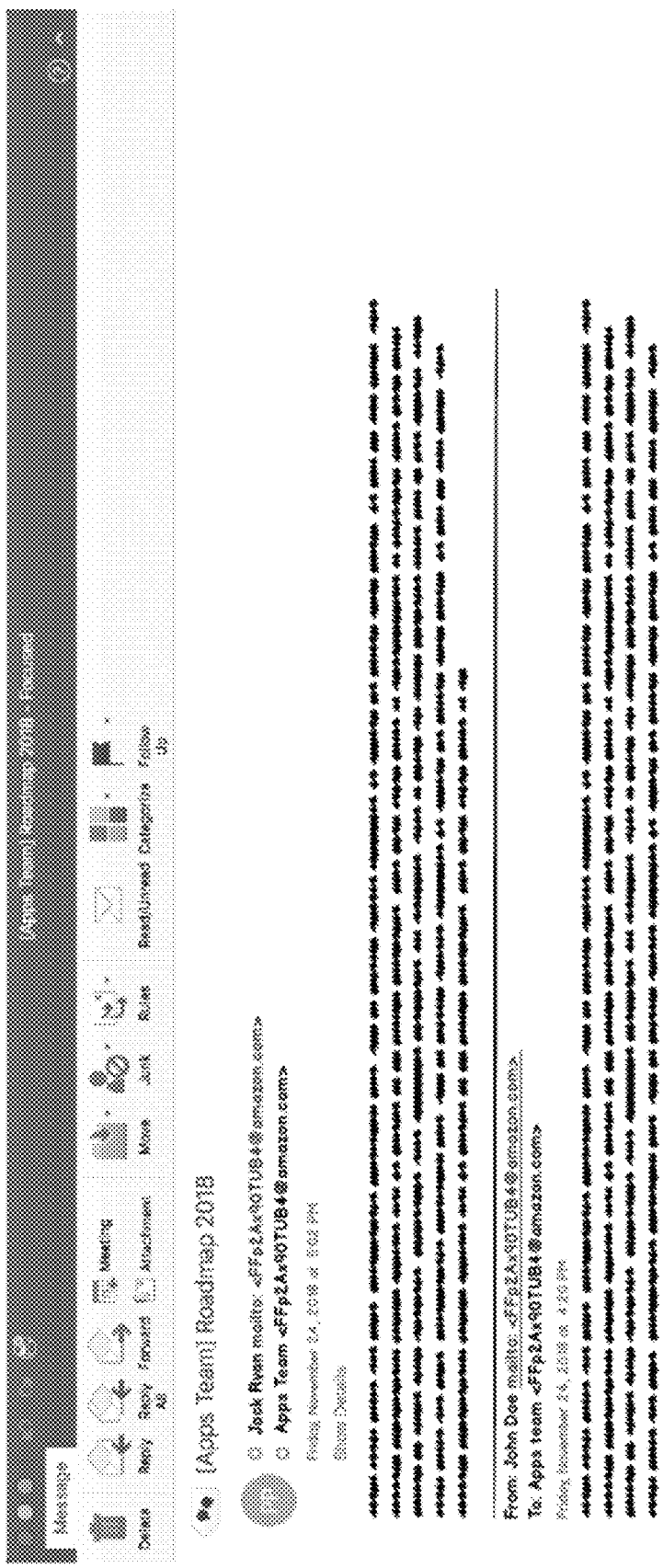
FIG. 2B is a diagram illustrating an example electronic mail message generated based on a data items in an information stream.

FIG. 2B is a diagram illustrating an example electronic mail message generated based on a data items in an information stream. The communication platform may allow users to access information streams via a native application managed by a service provider of the communication platform. However, some users may desire to access the communication platform via other applications, such as an electronic mail application. These users may not be registered as users of the communication platform. The communication platform may generate an electronic mail message comprising one or more data items. In FIG. 2B, two data items are shown in a single electronic mail message to a user. To reply to the electronic mail message, the user receiving the electronic mail message may reply using any electronic mail application.

The communication platform may be configured to generate a new topic (e.g., or conversation) based on the reply from the user. The reply message can be may be sent to the sender of the message (e.g., James Smith<FFp2Ax90TUB4@amazon.com>) and/or the information stream (e.g., Apps Team—<FFp2Ax90TUB4@amazon.com>).

The communication platform may process the reply email by removing history information (e.g., prior data items), extracting the reply text (e.g., or other data/attachments) added to the reply by the user, and/or the like. The reply text may be added as a data item of the information stream. This update to the information stream may trigger sending of electronic mail messages to any users associated with email communication (e.g., users that are not registered users of the communication platform, the user that sent the message).

Figure 2C:
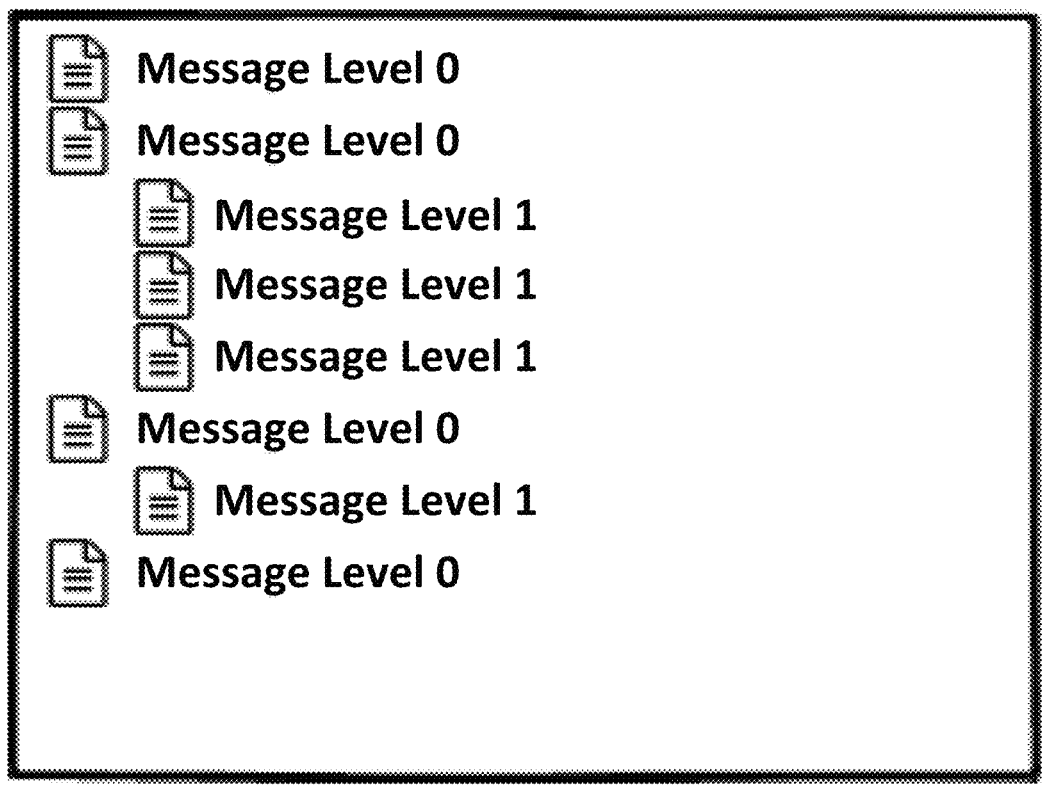
FIG. 2C is a diagram illustrating an example of associating different levels with data items for an information stream.

FIG. 2C is a diagram illustrating an example of associating different levels with data items for an information stream. The communication platform may be configured to apply one or more rules for adding the reply text to the information stream. The one or more rules may comprise rules for associating data items with different levels. A received email message (e.g., having reply text) may be associated with one or more levels, such as a first level (e.g., Level 0) and a second level (e.g., Level 1). The first message in a topic/conversation may be assigned to the first level. A reply to a not already answered first level message may be assigned to the first level. A reply to an already answered first level message may be assigned to a second level. Any answer to a message that is assigned a second level may also be assigned the second level. Data items may be added to the information stream as immediately following the data item they are an answer to and/or immediately following already existing answers for that original data item.

Figure 2D:
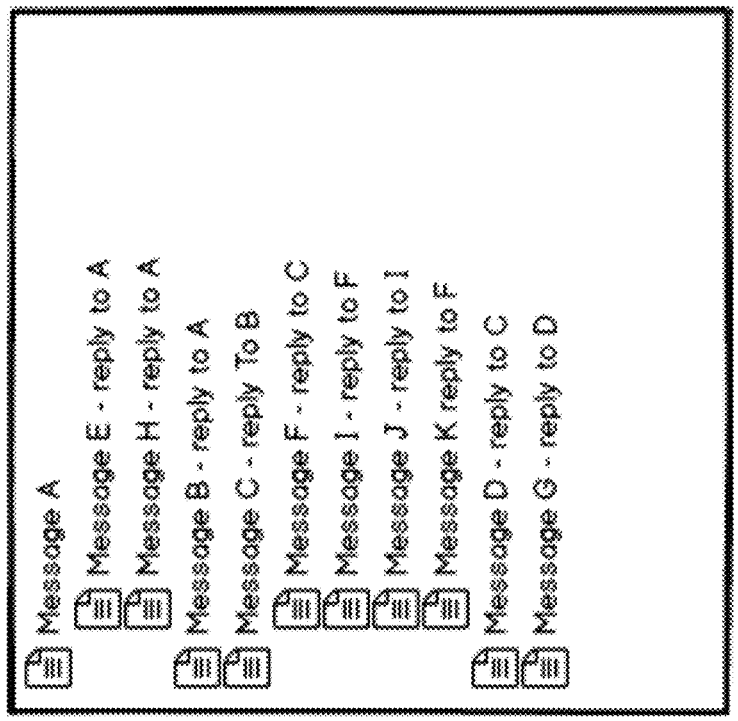
FIG. 2D is a diagram illustrating a comparison of different representations of levels of data items.
Figure 2D:
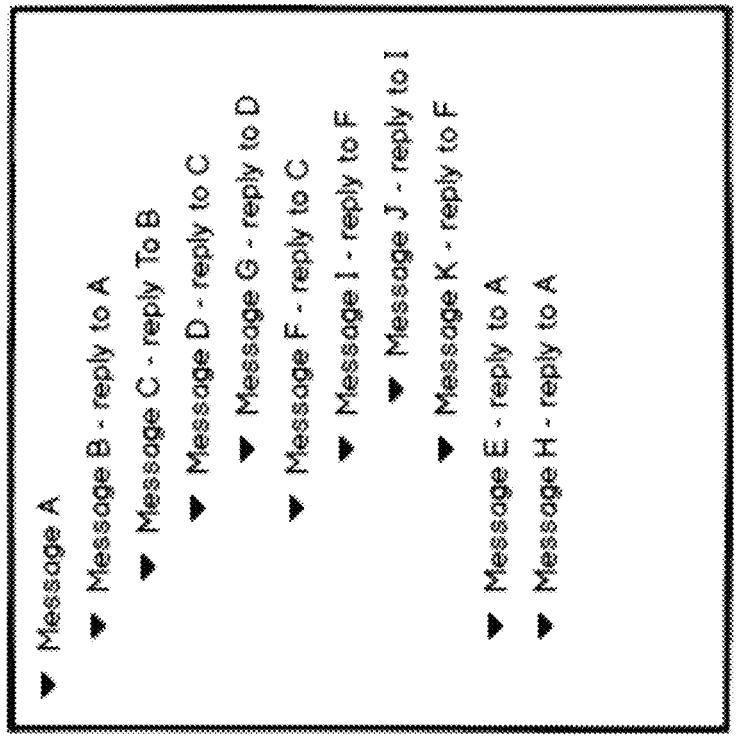

The communication platform may represent the levels in a user interface showing the information stream as well as in electronic mail messages sent to users. FIG. 2D shows an example comparison of representation of levels of data items. On the left side is shown an example of representing levels of data items in an electronic mail message. Each level may be indented (e.g., in an amount based on the level) in the electronic mail message, a character may be used such as an arrow or bar to indicate different levels in the electronic mail message. On the right is shown an example of representing levels of data items in a user interface of the communication platform.

The communication platform may be configured to generate new topics (e.g., or conversations) based on an electronic mail message from a user. To create a new topic in an information stream using an email client, the sender may send an electronic mail message to an electronic mail address associated with the information stream. The communication platform may receive the electronic mail message and determine that the message is associated with the information stream based on the email address. The communication platform may add the electronic mail message as a data item of the information stream. The communication platform may send an electronic mail message to any electronic mail addresses associated with the information stream indicating that the data item (e.g., from the original email message) was added to the information stream. The sender of the electronic mail message may receive an electronic mail message indicating that the sender's electronic mail message was added as a data item to the information stream. The electronic mail message received by the sender may show a context of where the message was added (e.g., what level, placement next to other recent topics). If the sender (e.g., or the sender's electronic mail address) is not a member of the stream, then the email message may be bounced back (e.g., rejected, responded to, by the communication system) with an error to notify the sender that the sender does not have permission to post to that information stream.

Figure 3:
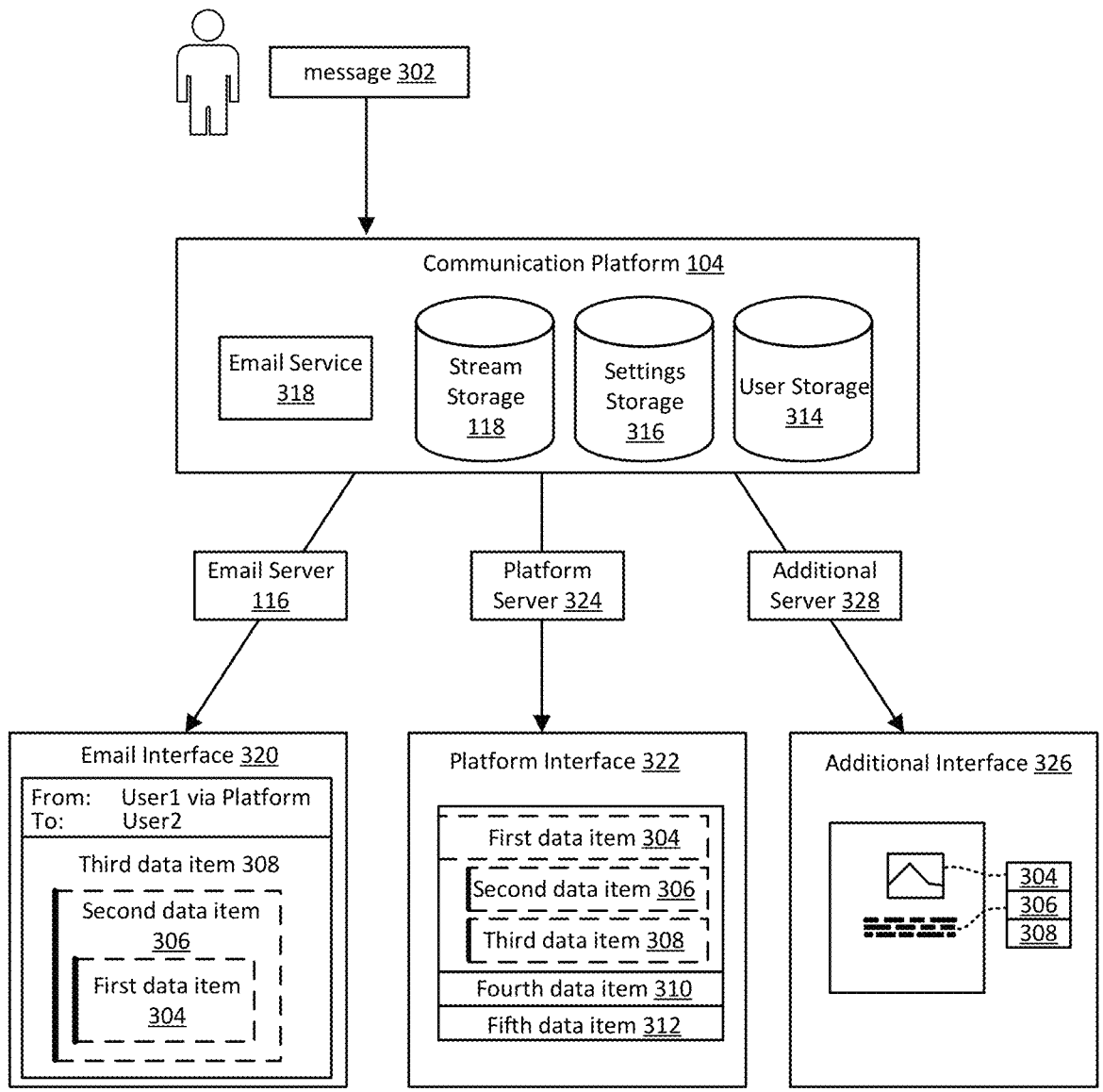
FIG. 3 is a diagram illustrating conversion of a message to different formats.

FIG. 3 is a diagram illustrating conversion of a message to different formats. A user may send a message 302 to the communication platform 104. The message 304 may be intended for a particular information stream. The communication platform 104 may determine that the message 302 is intended for the information stream (e.g., based on a stream identifier in the message 302). The communication platform 104 may determine that the message 302 is associated with a topic (e.g., conversation) of the information stream (e.g., based on a topic identifier in the message 302).

The communication platform 104 may store the message 104 as a data item of the information stream. The information stream stored in the stream storage 118 may comprise a plurality of data items, such as a first data item 304, a second data item 306, a third data item 308, a fourth data item 310, and a fifth data item 312. The message 102 may be stored as the third data item 306. The first data item 304, the second data item 306, and the third data item 308 may be associated with the same topic. The second data item 306 and the third data item 308 may be in response to the first data item 304.

The communication platform 304 may access the user storage 314 to determine a plurality of users associated with (e.g., subscribing to) the information stream. For each user, the communication platform 104 may determine a communication setting by accessing the communication setting associated with a particular user in the settings storage 316. The communication setting for the user may indicate that the user communicates with the communication platform 104 via email. The communication setting for the user may indicate that the user communicates with the communication platform 104 via a platform server 324 and/or an additional server 328.

A communication setting may be associated with a corresponding formatting rule. A formatting rule may specify a specify a layout to represent data items from the information stream. A formatting rule may specify an order to represent data items from the information stream. A formatting rule may specify which data items to include from the information stream and/or which data items to omit. The formatting rule may specify data requirements, such as data fields, data field lengths, order of data fields, and/or the like. The formatting rule may specify conversion logic for converting content from one type of content to another. As an example embodiment, hypertext markup language (HTML) formatting may be converted to plain text. Raw data (e.g., images, videos) may be represented using a scripting language (e.g., HTML, javascript) that is configured to access and/or show the data. As another example embodiment, computer readable code (e.g., Scripting language) defining application components may be removed, converted to a different computer readable language, or converted into a link. Data formats that are unique to a specific application platform may be converted to an attachment and/or a link to access the data from an application able to render the data.

In an embodiment, the formatting rule may comprise an email formatting rule associated with email communication. The email formatting rule may specify that an email message to a user comprises a "to" field, a "from" field, a subject field, a body field, and/or the like. The email formatting rule may specify that data for the subject field be generated based on a topic (e.g., or subject line of the originating data item of a thread) associated with a data item being sent. The email formatting rule may specify that data for the body field be generated based on content in a data item being sent, such as text, image, videos, and/or the like. In an embodiment, the email formatting rule may specify that media content, such as images, video, application components, be removed (e.g., if the user is associated with plain text email) and/or converted to another format, such as HTML, a description of the content, or a link to the content. In an embodiment, the email formatting rule may specify that prior data items are shown in a hierarchy (e.g., via formatting bars, indentations, brackets). While a prior data item of a topic may be shown first in a typical user interface, the email formatting rule may reverse the order so that the latest data item triggering the email is shown first and prior data items are shown as nested replies.

If a user has a communication setting indicating that the user communicates with the communication platform 104 via email, then the communication platform 104 may generate (e.g., based on the message 302 or third data item 308) an email using the email service 318. The email may be sent to the electronic mail server 116. The email may be delivered to the user. The user may access the email via an email interface 320. The user may open the email and reply to the email. The email server 116 may send the reply message to the communication platform 104 (e.g., possibly via another email server). The communication platform 104 may store a portion of the reply message as another data item of the information stream. The communication platform 104 may identify a difference between the content of the reply message and data already stored in the information stream. In an embodiment, if the user attaches a file, the file may be added as a data item in the information stream. If the user provided a text response, the text may be added as a data item in the information stream. If the user references another user of the communication platform, then the user may be identified and sent a notification.

Some communication settings may be associated with immediate actions to take in response to receiving a new data item, such as sending an email message or pushing data (e.g., a notification) to a server. Other communication settings may not require immediate actions. For example, a user may choose to access the information stream through a user interface at a time that is convenient. The user may have notifications and/or emails turned off. The communication platform 104 may determine a subset of users that require an action (e.g., email, notification) to be performed. The communication platform 104 may either perform the action or schedule performance of the action.

Some users may access the information stream via a platform interface 322 of the communication platform 104. In some implementations, no additional formatting of the third data item 308 may be needed. These users may simply open the platform interface 322, which may access the third data item 308 via platform server 324. For some users, the communication setting may indicate that a notification should be send for new activity on the information stream. For these users, a data notification may be sent to the platform interface 322 of the user. If the platform interface is mobile application, for example, the platform interface 322 or other operating system component may display a notification to the user.

Some users may access the information stream via an additional interface 326. The additional interface 326 may access the information stream via the additional server 328 (e.g., server associated an externa service 114 or internal service 106). If the communication rule indicates that a user accesses the information stream via the additional interface 326, then formatting rules associated with the additional interface 326 (e.g., if any) may be applied to the third data item. In an embodiment, these formatting rules may be triggered upon receipt of a new data item or upon a different event, such as receiving a request from the additional server 328. An example formatting rule may specify a format to associate a data item with corresponding content accessible via the additional interface 326. In an embodiment, a formatting rule may allow a portion of the content stored in a data item to be removed or converted to data allowing association of the data item with the portion of the content as rendered in the additional interface 326. For example, the formatting rule may allow a line or other graphic showing that a comment is about a specific portion of the content. In some scenarios, the formatting rules may be implemented by the additional server 328.

Figure 4:
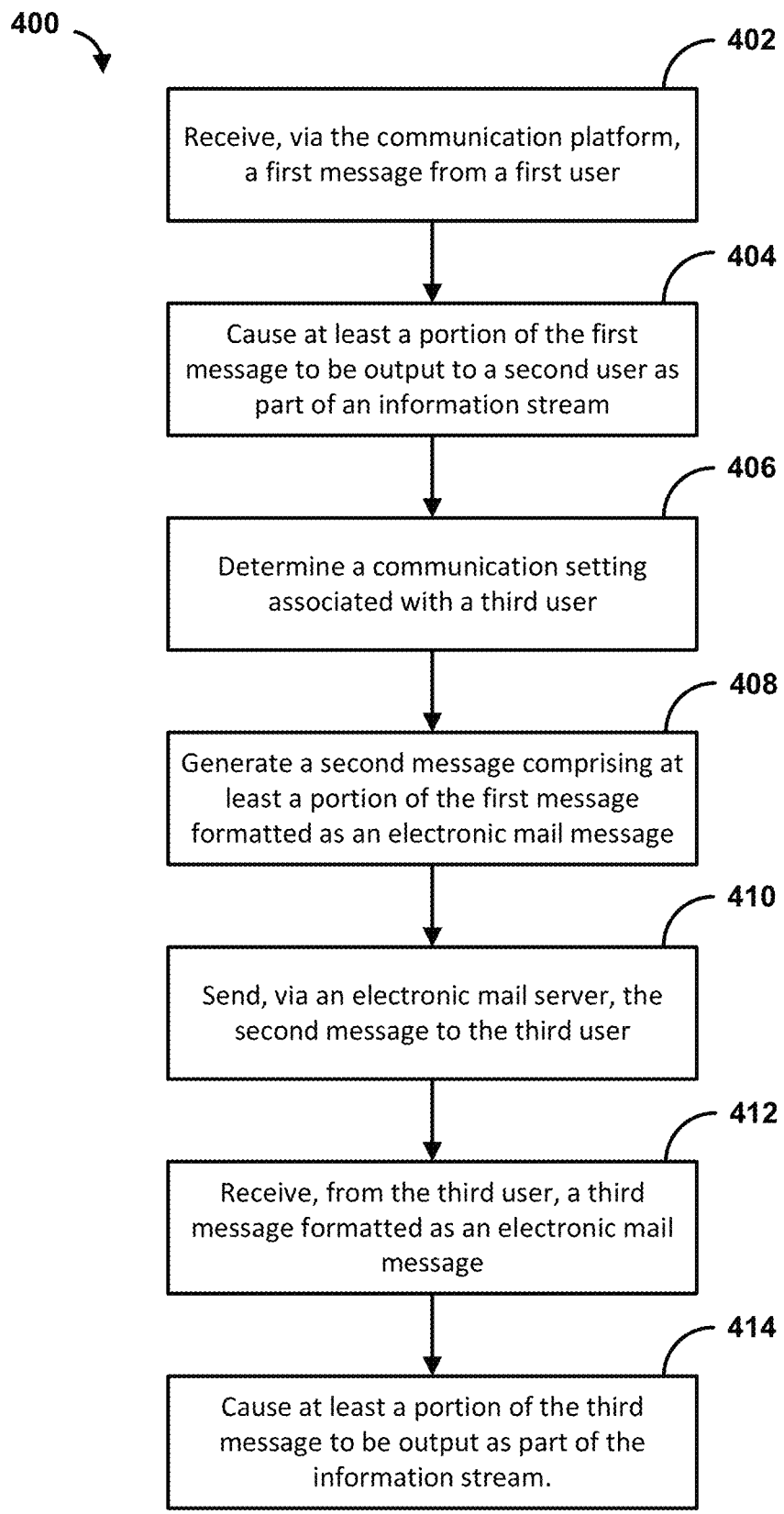
FIG. 4 is a flowchart illustrating an example method for communication.

FIG. 4 is a flowchart illustrating an example method 400 for processing communications. The method 400 may comprise a computer implemented method for facilitating communication among a plurality of users via a communication platform. The communication platform may be configured for organizing communication as a plurality of information streams. An information stream may comprise a plurality of messages. The plurality of messages may be organized by topics.

Operation 402 depicts receiving, via the communication platform, a first message from a first user of the plurality of users. The first message may be received via a user interface of the communication platform, such as a web interface, a mobile interface, and/or the like.

Operation 404 depicts causing at least a portion of the first message to be output to a second user of the plurality of users as part of an information stream. The first message may be caused to be output via a user interface of the communication platform. The first message may be associated with a topic and/or thread of the information stream. The second user may view the user interface and select an interface element associated with outputting the information stream. In an embodiment, the first message may be output in a format showing a plurality of messages of the information stream, a topic of the information stream, and/or a thread of the information stream.

Operation 406 depicts determining a communication setting associated with a third user of the plurality of users. The third user may be associated with the information stream. The communication setting may be indicative of the third user only being available to communicate with the communication platform via electronic mail messages. The communication setting may be indicative of the third user requesting communication via electronic messages. The third user may or may not have an account with the communication platform.

Operation 408 depicts generating, based on one or more formatting rules associated with the communication setting, a second message comprising at least a portion of the first message formatted as an electronic mail message. Generating the second message may comprise formatting the second message and the first message as an email thread in the electronic mail message. In an embodiment, the one or more formatting rules may specify a format for representing prior messages associated with a topic along with the first message.

Operation 410 depicts sending, via an electronic mail server, the second message to the third user. The electronic mail server may comprise a server managed by the communication platform. The electronic mail server may comprise a server external to the communication platform. The electronic mail server may be configured to store electronic mail messages, such as the second message, for the third user (e.g., until the third user accesses the second messages).

Operation 412 depicts receiving, from the third user, a third message associated with the second message and formatted as an electronic mail message. The third message may be received via the electronic mail server. The third message may be addressed to an electronic mail address associated with the information stream. The third user may receive the second message in an electronic mail user interface. The third user may respond to the second message by replying to the second message in the electronic mail user interface.

Operation 414 depicts causing at least a portion of the third message to be output as part of the information stream. The third message may be associated with the information stream, topic, or thread. Third message may be stored for future access by the first user and/or second user. In an embodiment, causing at least a portion of the third message to be output as part of the information stream may comprise determining a communication setting of the first user and/or the second user. The third message may be formatted for sending the third message to an electronic mail address and/or other external service associated with the first user, the second user, or any other user of the plurality of users.

Figure 5:
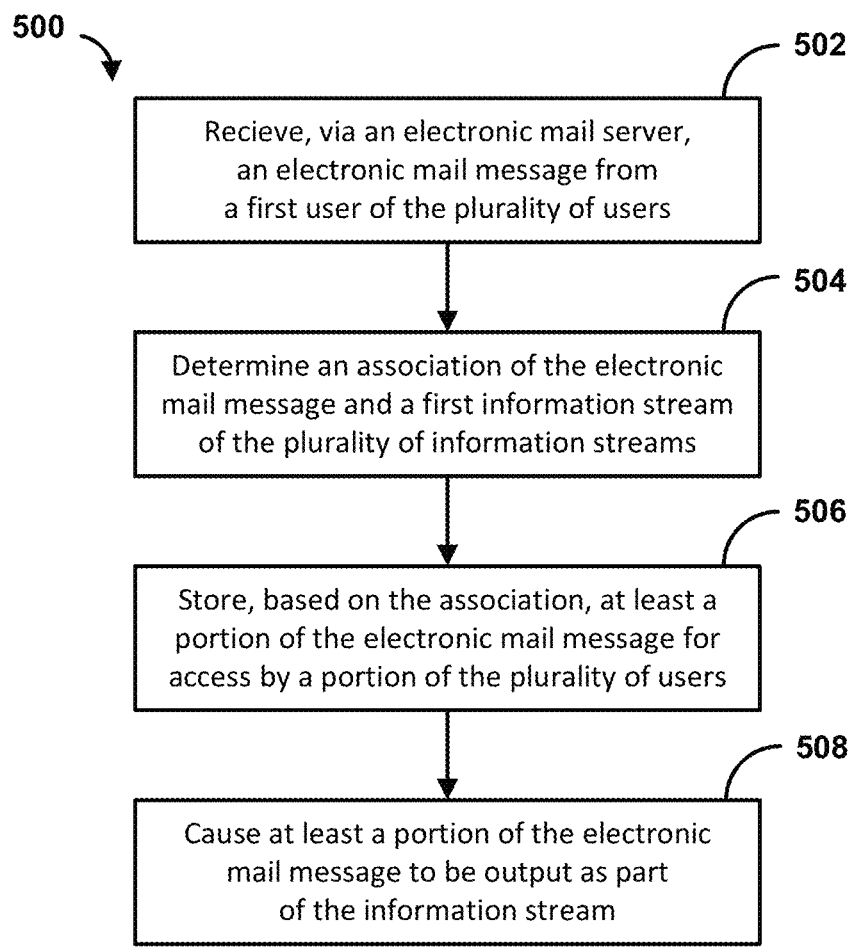
FIG. 5 is a flowchart illustrating an example method for communication.

FIG. 5 is a flowchart illustrating an example method 500 for processing communications. The method 500 may comprise a computer implemented method for facilitating communication among a plurality of users via a communication platform. In an embodiment, the communication platform may be configured for organizing communication as a plurality of information streams. An information stream may comprise a plurality of messages (e.g., or data items). The plurality of messages may be organized as a plurality of topics.

Operation 502 depicts receiving, via an electronic mail server, an electronic mail message from a first user of the plurality of users. The first message may or may not have an account with the communication platform before the electronic email message is received from the first user. If the first user does not have an account with the communication platform, an account may be generated for the first user based on receiving the electronic mail message. In an embodiment, a communication setting associated with the first user may be indicative of the first user communicating with (e.g., only accesses) the communication platform via electronic mail communication.

Operation 504 depicts determining an association of the electronic mail message and a first information stream of the plurality of information streams. The association may be determined based on an identifier in the electronic mail message. The identifier may be in a subject line of the electronic mail message, in the body of the electronic mail message, and/or in a field of the electronic mail message. The association may be determined based on an email address (e.g., the destination address) in the electronic mail message. The identifier (e.g., email address) may be generated specifically for communication with the first information stream, a topic of the first information stream, and/or a thread of the first information stream. In an embodiment, the identifier may be identified by a symbol, such as a hashtag. The association may be determined based on data in the body of the electronic mail message. The data in the body of the electronic mail message may comprise at least a portion of a data item of the first information stream. In an embodiment, a search may be performed to match the data in the body of the electronic mail message to a data item in an information stream. The association may be determined based on an association of an email address in the first user being associated with the first information stream.

A determination may be made that the electronic mail message is not associated with any of the plurality of topics associated with first information stream. A new topic associated with the information stream may be generated (e.g., based on the electronic mail message). The first message may be associated with the new topic. The new topic may be generated based on at least a portion of the subject line of the electronic mail message. In an embodiment, the new topic may be generated based on analysis of the body of the electronic message, such as word analysis, topic recognition, and/or the like.

Operation 506 depicts storing, by the communication platform and based on the association, at least a portion of the electronic mail message for access by a portion of the plurality of users associated with the first information stream. The first information stream may comprise at least one data item received via an application interface managed by the communication platform. The first information stream may comprise at least one data item received via a service external to the communication platform. The service external to the communication platform may comprise one or more of an email service of the electronic mail server, a web service not managed by a service provider of the communication platform, an application service not managed by the service provider, or a service managed by the service provider. Access to the information stream may be provided to the service external to the communication platform by sending data associated with a component of a user interface of the service external to the communication platform.

Operation 508 depicts causing at least a portion of the electronic mail message to be output as part of the information stream. The portion of the electronic mail message may be caused to be output based on data indicative of a request to access the first information stream from a second user of the plurality of users. The second user may view the user interface and select an interface element associated with outputting the information stream. In an embodiment, the first message may be output in a format showing a plurality of messages of the information stream, a topic of the information stream, and/or a thread of the information stream.

In some scenarios, a second message associated with the information stream may be received (e.g., by the communication platform). A third message comprising at least a portion of the second message formatted as an electronic mail message may be generated. The third message may be generated based on one or more formatting rules for converting data items of the information stream to an electronic mail message. The third message may comprise an email thread comprising a history of data items organized based on timing information associated with the data items, and wherein the one or more formatting rules comprise a rule for converting data items associated with an information stream to the email thread. The third message may be sent to the first user.

Figure 6:
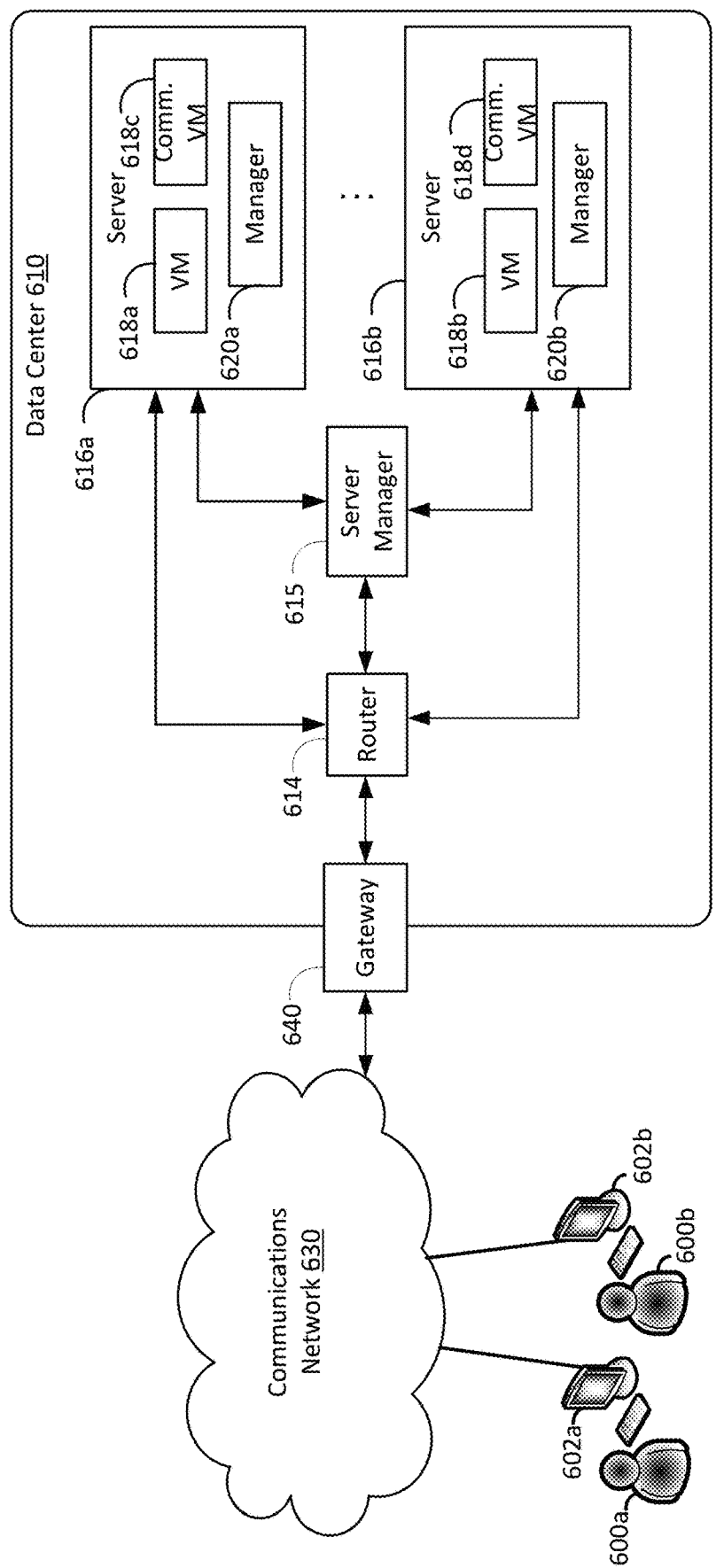
FIG. 6 is a diagram illustrating an example computing system that may be used in some embodiments.

As set forth above, a communication platform may allow communication between a plurality of users. An example computing environment that enables communication between a plurality of users will now be described in detail. In particular, FIG. 6 illustrates an example computing environment in which the embodiments described herein may be implemented. FIG. 6 is a diagram schematically illustrating an example of a data center 610 that can provide computing resources to users 600a and 600b (which may be referred herein singularly as user 600 or in the plural as users 600) via user computers 602a and 602b (which may be referred herein singularly as computer 602 or in the plural as computers 602) via a communications network 630. Data center 610 may be configured to provide computing resources for executing applications on a permanent or an as-needed basis. The computing resources provided by data center 610 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 610 may include servers 616a-b (which may be referred herein singularly as server 616 or in the plural as servers 616) that provide computing resources. These resources may be available as bare metal resources, or as virtual machine instances 618a-d and (which may be referred herein singularly as virtual machine instance 618 or in the plural as virtual machine instances 618). Virtual machine instances 618c and 618d may be virtual machine instances associated with implementing the communication platform described herein. The virtual machine instances 218c and 218d may be configured to perform all or any portion of the communication techniques described in the present disclosure. As should be appreciated, while the particular example illustrated in FIG. 6 includes one virtual machine for the communication platform in each server, this is merely an example. A server may include more than one virtual machine associated with the communication platform or may not include any virtual machines associated with the communication platform.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 6, communications network 630 may, for example, be a publicly accessible network of linked networks and possibly operated by various distinct parties, such as the Internet. In other embodiments, communications network 630 may be a private network, such as, a corporate or university network that is wholly or partially inaccessible to non-privileged users. In still other embodiments, communications network 630 may include one or more private networks with access to and/or from the Internet.

Communication network 630 may provide access to computers 602. User computers 602 may be computers utilized by users 600 or other customers of data center 610. For instance, user computer 602a or 602b may be a server, a desktop or laptop personal computer, a tablet computer, a wireless telephone, a personal digital assistant (PDA), an e-book reader, a game console, a set-top box or any other computing device capable of accessing data center 610. User computer 602a or 602b may connect directly to the Internet (e.g., via a cable modem or a Digital Subscriber Line (DSL)). Although only two user computers 602a and 602b are depicted, it should be appreciated that there may be multiple user computers.

User computers 602 may also be utilized to configure aspects of the computing resources provided by data center 610. In this regard, data center 610 might provide a gateway or web interface through which aspects of its operation may be configured through the use of a web browser application program executing on user computer 602. Alternately, a stand-alone application program executing on user computer 602 might access an application programming interface (API) exposed by data center 610 for performing the configuration operations. Other mechanisms for configuring the operation of various web services available at data center 610 might also be utilized.

Servers 616 shown in FIG. 6 may be standard servers configured appropriately for providing the computing resources described above and may provide computing resources for executing one or more web services and/or applications. In one embodiment, the computing resources may be virtual machine instances 618. In the example of virtual machine instances, each of the servers 616 may be configured to execute an instance manager 620a or 620b (which may be referred herein singularly as instance manager 620 or in the plural as instance managers 620) capable of executing the virtual machine instances 618. The instance managers 620 may be a virtual machine monitor (VMM) or another type of program configured to enable the execution of virtual machine instances 618 on server 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 610 shown in FIG. 6, a router 614 may be utilized to interconnect the servers 616a and 616b. Router 614 may also be connected to gateway 640, which is connected to communications network 630. Router 614 may be connected to one or more load balancers, and alone or in combination may manage communications within networks in data center 610, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 610 shown in FIG. 6, a server manager 615 is also employed to at least in part direct various communications to, from and/or between servers 616a and 616b. While FIG. 6 depicts router 614 positioned between gateway 640 and server manager 615, this is merely an exemplary configuration. In some cases, for example, server manager 615 may be positioned between gateway 640 and router 614. Server manager 615 may, in some cases, examine portions of incoming communications from user computers 602 to determine one or more appropriate servers 616 to receive and/or process the incoming communications. Server manager 615 may determine appropriate servers to receive and/or process the incoming communications based on factors such as an identity, location or other attributes associated with user computers 602, a nature of a task with which the communications are associated, a priority of a task with which the communications are associated, a duration of a task with which the communications are associated, a size and/or estimated resource usage of a task with which the communications are associated and many other factors. Server manager 615 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 610 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
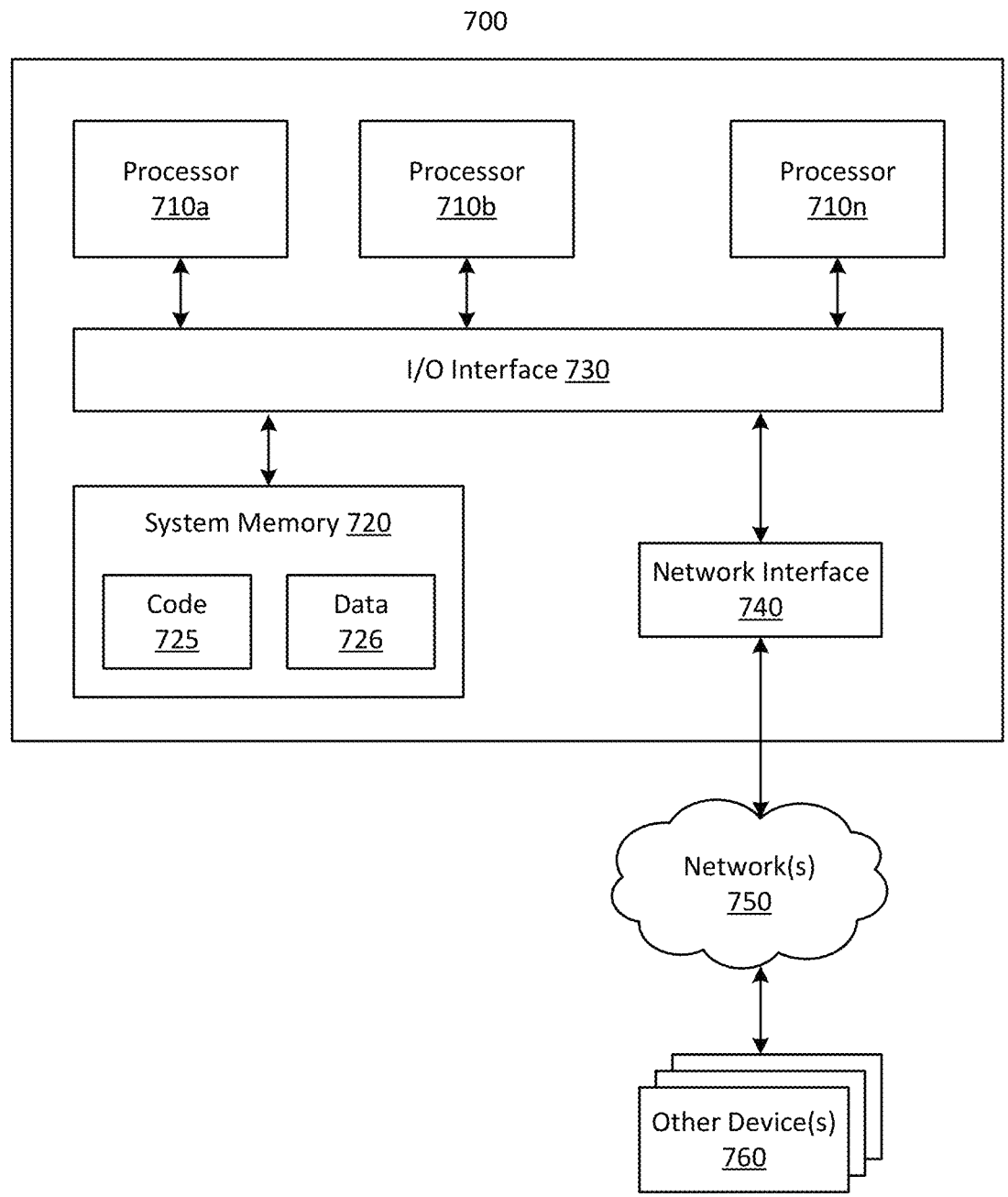
FIG. 7 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710a, 710b and/or 710n (which may be referred herein singularly as "a processor 710" or in the plural as "the processors 710") coupled to a system memory 720 via an input/output (I/O) interface 730. Computing device 7100 further includes a network interface 740 coupled to I/O interface 730.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC or MIPS ISAs or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 40 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 70. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 700 as system memory 70 or another type of memory. Further, a computer-accessible medium may include transmission media or signals such as electrical, electromagnetic or digital signals conveyed via a communication medium such as a network and/or a wireless link, such as those that may be implemented via network interface 70. Portions or all of multiple computing devices such as those illustrated in FIG. 6 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer implemented method for facilitating communication among a plurality of users via a communication platform, the method comprising:
   receiving, via the communication platform, a first message from a first user of the plurality of users;
   causing at least a portion of the first message to be output, via a user interface of the communication platform, to a second user of the plurality of users as part of an information stream, wherein the communication platform is configured for organizing communication as a plurality of information streams;
   determining a communication setting associated with a third user of the plurality of users, wherein the third user is associated with the information stream, wherein the communication setting indicates that the third user communicates with the communication platform via electronic mail;
   generating, based on one or more formatting rules associated with the communication setting, a second message comprising at least a portion of the first message formatted as an electronic mail message;
   sending, via an electronic mail server, the second message to the third user;
   receiving, from the third user, a third message associated with the second message and formatted as an electronic mail message; and
   causing at least a portion of the third message to be output as part of the information stream.

2. The method of claim 1, wherein generating the second message comprises formatting the second message and the first message as an email thread in the electronic mail message.

3. The method of claim 1, wherein the information stream comprises a plurality of messages organized by topics, and wherein the one or more formatting rules specify a format for representing prior messages associated with a topic along with the first message.

4. A system for facilitating communication among a plurality of users via a communication platform, the system comprising one or more memories having instructions thereon that, upon execution, at least cause the system to:
   receive, via an electronic mail server, an electronic mail message from a first user of the plurality of users;

determine an association of the electronic mail message and a first information stream of a plurality of information streams;

store, by the communication platform and based on the association, at least a portion of the electronic mail message for access by a portion of the plurality of users associated with the first information stream, wherein the first information stream comprises at least one data item received via an application interface managed by the communication platform and at least one data item received via a service external to the communication platform; and cause, based on data indicative of a request to access the first information stream from a second user of the plurality of users, at least a portion of the electronic mail message to be output as part of the first information stream.

5. The system of claim 4, wherein the service external to the communication platform comprises one or more of an email service of the electronic mail server, a web service not managed by a service provider of the communication platform, an application service not managed by the service provider, or a service managed by the service provider.

6. The system of claim 4, wherein the system is configured to determine the association of the electronic mail message and the first information stream of the plurality of information streams based on or more of a destination email address of the first message or an identifier, associated with the first information stream, in the first message.

7. The system of claim 4, wherein the system is configured to aggregate, based on a plurality of data items of the first information stream, a collection of resources external to the communication platform that are associated with the first information stream.

8. The system of claim 4, wherein the system is further configured to provide access to the first information stream to the service external to the communication platform by sending data associated with a component of a user interface of the service external to the communication platform.

9. The system of claim 4, wherein the first information stream is organized based on a plurality of topics, and wherein each topic is associated with one or more data items.

10. The system of claim 9, wherein the system is further configured to:
  determine that the electronic mail message is not associated with any of the plurality of topics;
  generate a new topic associated with the first information stream; and
  associate the first message with the new topic.

11. The system of claim 4, wherein the system is further configured to:
  receive a second message associated with the first information stream;
  generate a third message comprising at least a portion of the second message formatted as an electronic mail message; and
  send the third message to the first user.

12. The system of claim 11, wherein the electronic mail message is in response to the third message.

13. The system of claim 11, wherein the system is further configured to generate, based on one or more formatting rules for converting data items of the first information stream to an electronic mail message, the third message.

14. The system of claim 11, wherein the third message comprises an email thread comprising a history of data items organized based on timing information associated with the data items, and wherein the one or more formatting rules comprise a rule for converting data items associated with the first information stream to the email thread.

15. The system of claim 4, wherein the first user does not have an account with the communication platform before the electronic email message is received from the first user.

16. A non-transitory computer-readable storage medium having stored thereon computer readable instructions, the computer-readable instructions comprising instructions that upon execution on one or more computing devices, at least cause:
  receiving, via an electronic mail server, an electronic mail message from a first user of the plurality of users;
  determining an association of the electronic mail message and a first information stream of the plurality of information streams;
  storing, by the communication platform and based on the association, at least a portion of the electronic mail message for access by a portion of the plurality users associated with the first information stream, wherein the first information stream comprises at least one data item received via an application interface managed by the communication platform and at least one data item received via a service external to the communication platform; and
  causing, based on data indicative of a request to access the first information stream from a second user of the plurality of users, at least a portion of the electronic mail message to be output as part of the first information stream.

17. The computer-readable storage medium of claim 16, wherein the service external to the communication platform comprises one or more of an email service of the electronic mail server, a web service not managed by a service provider of the communication platform, an application service not managed by the service provider, or a service managed by the service provider.

18. The computer-readable storage medium of claim 16, wherein the electronic mail message is in response to a prior electronic mail message generated by the communication platform and comprising a data item posted to the first information stream, and wherein causing at least a portion of the electronic mail message to be output as part of the first information stream comprising causing the electronic mail message to displayed as a response to the data item posted to the first information stream.

19. The computer-readable storage medium of claim 16, wherein the communication platform comprises a communication setting associated with the first user indicative of the first user communication with the communication platform via electronic mail.

20. The computer-readable storage medium of claim 16, wherein the first information stream is organized based on a plurality of topics, and wherein each topic is associated with one or more data items.

* * * * *